(12) United States Patent
Forgeron et al.

(10) Patent No.: US 10,350,787 B2
(45) Date of Patent: Jul. 16, 2019

(54) CARBONATION OF CEMENT MIXES

(71) Applicant: CarbonCure Technologies Inc., Darthmouth, Nova Scotia (CA)

(72) Inventors: Dean Paul Forgeron, White's Lake (CA); George Sean Monkman, Montreal (CA); Joshua Jeremy Brown, Lower Sackville (CA); Kevin Cail, Sarasota, FL (US); Jay Crossman, Truro (CA); Paul J. Sandberg, Beverly, MA (US); Mark MacDonald, Halifax (CA)

(73) Assignee: CarbonCure Technologies Inc., Dartmouth, NS (CA)

( * ) Notice: Subject to any disclaimer, the term of this patent is extended or adjusted under 35 U.S.C. 154(b) by 215 days.

(21) Appl. No.: 15/240,954

(22) Filed: Aug. 18, 2016

(65) Prior Publication Data

US 2017/0043499 A1 Feb. 16, 2017

Related U.S. Application Data

(63) Continuation of application No. PCT/CA2015/050118, filed on Feb. 18, 2015.

(60) Provisional application No. 61/941,222, filed on Feb. 18, 2014, provisional application No. 62/096,018, filed on Dec. 23, 2014.

(51) Int. Cl.
| | |
|---|---|
| *B28C 5/02* | (2006.01) |
| *B28C 5/46* | (2006.01) |
| *B01F 5/06* | (2006.01) |
| *B01F 15/02* | (2006.01) |
| *C04B 40/02* | (2006.01) |
| *B01F 3/04* | (2006.01) |
| *B01F 15/00* | (2006.01) |

(52) U.S. Cl.
CPC .............. *B28C 5/02* (2013.01); *B01F 3/0446* (2013.01); *B01F 3/04439* (2013.01); *B01F 5/069* (2013.01); *B01F 5/0655* (2013.01); *B01F 15/0022* (2013.01); *B01F 15/00175* (2013.01); *B01F 15/024* (2013.01); *B28C 5/462* (2013.01); *C04B 40/0231* (2013.01); *B01F 2003/04893* (2013.01); *B01F 2003/04971* (2013.01); *B01F 2215/0047* (2013.01); *Y02P 40/18* (2015.11)

(58) Field of Classification Search
CPC ....................................................... B28C 5/02
USPC ......................................................... 366/3–5
See application file for complete search history.

(56) References Cited

U.S. PATENT DOCUMENTS

| | | |
|---|---|---|
| 128,980 A | 7/1872 | Rowland |
| 170,594 A | 11/1875 | Richardson |
| (Continued) | | |

FOREIGN PATENT DOCUMENTS

| | | |
|---|---|---|
| AU | 2397377 A | 10/1978 |
| AU | 504446 B2 | 10/1979 |
| (Continued) | | |

OTHER PUBLICATIONS

Co-pending U.S. Appl. No. 15/284,186, filed Oct. 3, 2016.

(Continued)

*Primary Examiner* — David L Sorkin
(74) *Attorney, Agent, or Firm* — Wilson Sonsini Goodrich & Rosati (57) ABSTRACT

The invention provides methods and compositions for carbonation of cement mixes using pressurized carbon dioxide delivered to the mix.

19 Claims, 3 Drawing Sheets

(56) References Cited

U.S. PATENT DOCUMENTS

| | | | |
|---|---|---|---|
| 461,888 A | 10/1891 | Richardson |
| 1,932,150 A | 10/1933 | Tada |
| 2,254,016 A | 8/1941 | Melton et al. |
| 2,259,830 A | 10/1941 | Osborne |
| 2,329,940 A | 9/1943 | Ponzer |
| 2,496,895 A | 2/1950 | Staley |
| 2,498,513 A | 2/1950 | Cuypers |
| 2,603,352 A | 7/1952 | Tromp |
| 3,002,248 A | 10/1961 | Willson |
| 3,184,037 A | 5/1965 | Greaves et al. |
| 3,356,779 A | 12/1967 | Schulze |
| 3,358,342 A | 12/1967 | Spence |
| 3,442,498 A | 5/1969 | Noah |
| 3,468,993 A | 9/1969 | Knud |
| 3,492,385 A | 1/1970 | Branko |
| 3,667,242 A | 6/1972 | Robert |
| 3,752,314 A | 8/1973 | Brown et al. |
| 3,757,631 A | 9/1973 | McManus et al. |
| 3,917,236 A | 11/1975 | Hanson |
| 3,957,203 A | 5/1976 | Bullard |
| 4,068,755 A | 1/1978 | Parkes et al. |
| 4,069,063 A | 1/1978 | Ball |
| 4,076,782 A | 2/1978 | Yazawa et al. |
| 4,093,690 A | 6/1978 | Murray |
| 4,117,060 A | 9/1978 | Murray |
| 4,257,710 A | 3/1981 | Delcoigne et al. |
| 4,266,921 A | 5/1981 | Murray |
| 4,275,836 A | 6/1981 | Egger |
| 4,350,567 A | 9/1982 | Moorehead et al. |
| 4,362,679 A | 12/1982 | Malinowski |
| 4,420,868 A | 12/1983 | McEwen et al. |
| 4,427,610 A | 1/1984 | Murray |
| 4,436,498 A | 3/1984 | Murray |
| 4,526,534 A | 7/1985 | Wollmann |
| 4,588,299 A | 5/1986 | Brown et al. |
| 4,613,472 A | 9/1986 | Svanholm |
| 4,746,481 A | 5/1988 | Schmidt |
| 4,772,439 A | 9/1988 | Trevino-Gonzalez |
| 4,789,244 A | 12/1988 | Dunton et al. |
| 4,846,580 A | 7/1989 | Oury |
| 4,881,347 A | 11/1989 | Mario et al. |
| 4,917,587 A | 4/1990 | Alpar et al. |
| 4,944,595 A | 7/1990 | Hodson |
| 5,051,217 A | 9/1991 | Alpar et al. |
| 5,158,996 A | 10/1992 | Valenti |
| 5,162,402 A | 11/1992 | Ogawa et al. |
| 5,203,919 A | 4/1993 | Bobrowski et al. |
| 5,220,732 A | 6/1993 | Lee |
| 5,232,496 A | 8/1993 | Jennings et al. |
| 5,244,498 A | 9/1993 | Steinke |
| 5,257,464 A | 11/1993 | Trevino-Gonzales |
| 5,298,475 A | 3/1994 | Shibata et al. |
| 5,352,035 A | 10/1994 | Macaulay et al. |
| 5,356,579 A | 10/1994 | Jennings et al. |
| 5,358,566 A | 10/1994 | Tanaka et al. |
| 5,360,660 A | 11/1994 | Nohlgren |
| 5,393,343 A | 2/1995 | Darwin et al. |
| 5,427,617 A | 6/1995 | Bobrowski et al. |
| 5,451,104 A * | 9/1995 | Kleen ................ B01F 3/04446 366/101 |
| 5,453,123 A | 9/1995 | Burge et al. |
| 5,458,470 A | 10/1995 | Mannhart et al. |
| 5,494,516 A | 2/1996 | Drs et al. |
| 5,505,987 A | 4/1996 | Jennings et al. |
| 5,518,540 A | 5/1996 | Jones, Jr. |
| 5,583,183 A | 12/1996 | Darwin et al. |
| 5,609,681 A | 3/1997 | Drs et al. |
| 5,612,396 A | 3/1997 | Valenti et al. |
| 5,624,493 A | 4/1997 | Wagh et al. |
| 5,633,298 A | 5/1997 | Arfaei et al. |
| 5,643,978 A | 7/1997 | Darwin et al. |
| 5,650,562 A | 7/1997 | Jones, Jr. |
| 5,660,626 A | 8/1997 | Ohta et al. |
| 5,661,206 A | 8/1997 | Tanaka et al. |
| 5,665,158 A | 9/1997 | Darwin et al. |
| 5,667,298 A | 9/1997 | Musil et al. |
| 5,668,195 A | 9/1997 | Leikauf |
| 5,669,968 A | 9/1997 | Kobori et al. |
| 5,674,929 A | 10/1997 | Melbye |
| 5,676,905 A | 10/1997 | Andersen et al. |
| 5,690,729 A | 11/1997 | Jones, Jr. |
| 5,703,174 A | 12/1997 | Arfaei et al. |
| 5,725,657 A | 3/1998 | Darwin et al. |
| 5,728,207 A | 3/1998 | Arfaei et al. |
| 5,744,078 A | 4/1998 | Soroushian et al. |
| 5,752,768 A | 5/1998 | Assh |
| 5,753,744 A | 5/1998 | Darwin et al. |
| 5,798,425 A | 8/1998 | Albrecht et al. |
| 5,800,752 A | 9/1998 | Charlebois |
| 5,804,175 A | 9/1998 | Ronin et al. |
| 5,840,114 A | 11/1998 | Jeknavorian et al. |
| 5,873,653 A | 2/1999 | Paetzold |
| 5,882,190 A | 3/1999 | Doumet |
| 5,885,478 A | 3/1999 | Montgomery et al. |
| 5,912,284 A | 6/1999 | Hirata et al. |
| 5,935,317 A | 8/1999 | Soroushian et al. |
| 5,947,600 A | 9/1999 | Maeda et al. |
| 5,965,201 A | 10/1999 | Jones, Jr. |
| 6,008,275 A | 12/1999 | Moreau et al. |
| 6,042,258 A | 3/2000 | Hines et al. |
| 6,042,259 A | 3/2000 | Hines et al. |
| 6,063,184 A | 5/2000 | Leikauf et al. |
| 6,066,262 A | 5/2000 | Montgomery et al. |
| 6,113,684 A | 9/2000 | Kunbargi |
| 6,136,950 A | 10/2000 | Vickers, Jr. et al. |
| 6,187,841 B1 | 2/2001 | Tanaka et al. |
| 6,264,736 B1 | 7/2001 | Knopf et al. |
| 6,267,814 B1 | 7/2001 | Bury et al. |
| 6,284,867 B1 | 9/2001 | Vickers, Jr. et al. |
| 6,290,770 B1 | 9/2001 | Moreau et al. |
| 6,310,143 B1 | 10/2001 | Vickers, Jr. et al. |
| 6,318,193 B1 | 11/2001 | Brock et al. |
| 6,334,895 B1 | 1/2002 | Bland |
| 6,372,157 B1 | 4/2002 | Krill, Jr. et al. |
| 6,387,174 B2 | 5/2002 | Knopf et al. |
| 6,451,105 B1 | 9/2002 | Turpin, Jr. |
| 6,463,958 B1 | 10/2002 | Schwing |
| 6,517,631 B1 | 2/2003 | Bland |
| 6,648,551 B1 | 11/2003 | Taylor |
| 6,871,667 B2 | 3/2005 | Schwing et al. |
| 6,890,497 B2 | 5/2005 | Rau et al. |
| 6,936,098 B2 | 8/2005 | Ronin |
| 6,960,311 B1 | 11/2005 | Mirsky et al. |
| 6,997,045 B2 | 2/2006 | Wallevik et al. |
| 7,003,965 B2 | 2/2006 | Auer et al. |
| 7,201,018 B2 | 4/2007 | Gershtein et al. |
| 7,390,444 B2 | 6/2008 | Ramme et al. |
| 7,399,378 B2 | 7/2008 | Edwards et al. |
| 7,419,051 B2 | 9/2008 | Damkjaer et al. |
| 7,549,493 B1 | 6/2009 | Jones |
| 7,588,661 B2 | 9/2009 | Edwards et al. |
| 7,704,349 B2 | 4/2010 | Edwards et al. |
| 7,735,274 B2 | 6/2010 | Constantz et al. |
| 7,736,430 B2 | 6/2010 | Barron et al. |
| 7,771,684 B2 | 8/2010 | Constantz et al. |
| 7,815,880 B2 | 10/2010 | Constantz et al. |
| 7,879,146 B2 | 2/2011 | Raki et al. |
| 7,906,086 B2 | 3/2011 | Comrie |
| 7,914,685 B2 | 3/2011 | Constantz et al. |
| 7,922,809 B1 | 4/2011 | Constantz et al. |
| 7,950,841 B2 | 5/2011 | Klein et al. |
| 8,006,446 B2 | 8/2011 | Constantz et al. |
| 8,043,426 B2 | 10/2011 | Mohamed et al. |
| 8,105,558 B2 | 1/2012 | Comrie |
| 8,114,214 B2 | 2/2012 | Constantz et al. |
| 8,114,367 B2 | 2/2012 | Riman et al. |
| 8,118,473 B2 | 2/2012 | Cooley et al. |
| 8,137,455 B1 | 3/2012 | Constantz et al. |
| 8,157,009 B2 | 4/2012 | Patil et al. |
| 8,177,909 B2 | 5/2012 | Constantz et al. |
| 8,192,542 B2 | 6/2012 | Virtanen |
| 8,235,576 B2 | 8/2012 | Klein et al. |
| 8,272,205 B2 | 9/2012 | Estes et al. |
| 8,287,173 B2 | 10/2012 | Khouri |

(56) References Cited

U.S. PATENT DOCUMENTS

| | | |
|---|---|---|
| 8,311,678 B2 | 11/2012 | Koehler et al. |
| 8,313,802 B2 | 11/2012 | Riman et al. |
| 8,333,944 B2 | 12/2012 | Constantz et al. |
| 8,470,275 B2 | 6/2013 | Constantz et al. |
| 8,491,858 B2 | 7/2013 | Seeker et al. |
| 8,518,176 B2 | 8/2013 | Silva et al. |
| 8,584,864 B2 | 11/2013 | Lee et al. |
| 8,708,547 B2 | 4/2014 | Bilger |
| 8,709,960 B2 | 4/2014 | Riman et al. |
| 8,721,784 B2 | 5/2014 | Riman et al. |
| 8,746,954 B2 | 6/2014 | Cooley et al. |
| 8,845,940 B2 | 9/2014 | Niven et al. |
| 8,989,905 B2 | 3/2015 | Sostaric et al. |
| 9,061,940 B2 | 6/2015 | Chen et al. |
| 9,108,803 B2 | 8/2015 | Till |
| 9,108,883 B2 | 8/2015 | Forgeron et al. |
| 9,376,345 B2 | 6/2016 | Forgeron et al. |
| 9,388,072 B2 | 7/2016 | Niven et al. |
| 9,448,094 B2 | 9/2016 | Downie et al. |
| 9,463,580 B2 | 10/2016 | Forgeron et al. |
| 9,492,945 B2 | 11/2016 | Niven et al. |
| 9,738,562 B2 | 8/2017 | Monkman et al. |
| 9,758,437 B2 | 9/2017 | Forgeron et al. |
| 9,790,131 B2 | 10/2017 | Lee et al. |
| 2002/0019459 A1 | 2/2002 | Albrecht et al. |
| 2002/0047225 A1 | 4/2002 | Bruning et al. |
| 2002/0179119 A1 | 12/2002 | Harmon |
| 2003/0122273 A1 | 7/2003 | Fifield |
| 2005/0131600 A1 | 6/2005 | Quigley et al. |
| 2005/0219939 A1 | 10/2005 | Christenson et al. |
| 2007/0170119 A1 | 7/2007 | Mickelson et al. |
| 2007/0171764 A1 | 7/2007 | Klein et al. |
| 2007/0185636 A1 | 8/2007 | Cooley et al. |
| 2007/0215353 A1 | 9/2007 | Barron et al. |
| 2008/0092957 A1 | 4/2008 | Rosaen |
| 2008/0174041 A1 | 7/2008 | Firedman et al. |
| 2008/0202389 A1 | 8/2008 | Hojaji et al. |
| 2008/0245274 A1 | 10/2008 | Ramme |
| 2008/0308133 A1 | 12/2008 | Grubb et al. |
| 2008/0316856 A1 | 12/2008 | Cooley et al. |
| 2009/0093328 A1 | 4/2009 | Dickinger et al. |
| 2009/0103392 A1 | 4/2009 | Bilger |
| 2009/0143211 A1 | 6/2009 | Riman et al. |
| 2009/0292572 A1 | 11/2009 | Alden et al. |
| 2009/0294079 A1 | 12/2009 | Edwards et al. |
| 2010/0132556 A1 | 6/2010 | Constantz et al. |
| 2010/0239487 A1 | 9/2010 | Constantz et al. |
| 2010/0246312 A1 | 9/2010 | Welker et al. |
| 2011/0023659 A1 | 2/2011 | Nguyen et al. |
| 2011/0067600 A1 | 3/2011 | Constantz et al. |
| 2011/0165400 A1 | 7/2011 | Quaghebeur et al. |
| 2011/0198369 A1 | 8/2011 | Klein et al. |
| 2011/0249527 A1 | 10/2011 | Seiler et al. |
| 2011/0289901 A1 | 12/2011 | Estes et al. |
| 2011/0320040 A1 | 12/2011 | Koehler et al. |
| 2012/0238006 A1 | 9/2012 | Gartner et al. |
| 2012/0312194 A1 | 12/2012 | Riman et al. |
| 2013/0036945 A1 | 2/2013 | Constantz et al. |
| 2013/0122267 A1 | 5/2013 | Riman et al. |
| 2013/0125791 A1 | 5/2013 | Fried et al. |
| 2013/0139727 A1 | 6/2013 | Constantz et al. |
| 2013/0167756 A1 | 7/2013 | Chen et al. |
| 2013/0284073 A1 | 10/2013 | Gartner |
| 2013/0305963 A1 | 11/2013 | Fridman |
| 2014/0034452 A1 | 2/2014 | Lee et al. |
| 2014/0050611 A1 | 2/2014 | Warren et al. |
| 2014/0069302 A1 | 3/2014 | Saastamoinen et al. |
| 2014/0083514 A1 | 3/2014 | Ding |
| 2014/0090415 A1 | 4/2014 | Reddy et al. |
| 2014/0096704 A1 | 4/2014 | Rademan et al. |
| 2014/0104972 A1 | 4/2014 | Roberts et al. |
| 2014/0107844 A1 | 4/2014 | Koehler et al. |
| 2014/0116295 A1 | 5/2014 | Niven et al. |
| 2014/0127450 A1 | 5/2014 | Riman et al. |
| 2014/0197563 A1 | 7/2014 | Niven et al. |
| 2014/0208782 A1 | 7/2014 | Joensson et al. |
| 2014/0216303 A1 | 8/2014 | Lee et al. |
| 2014/0327168 A1 | 11/2014 | Niven et al. |
| 2014/0373755 A1 | 12/2014 | Forgeron et al. |
| 2015/0023127 A1 | 1/2015 | Chon et al. |
| 2015/0069656 A1 | 3/2015 | Bowers et al. |
| 2015/0197447 A1 | 7/2015 | Forgeron et al. |
| 2015/0232381 A1 | 8/2015 | Niven et al. |
| 2015/0247212 A1 | 9/2015 | Sakaguchi et al. |
| 2015/0298351 A1 | 10/2015 | Beaupré |
| 2015/0355049 A1 | 12/2015 | Ait et al. |
| 2016/0001462 A1 | 1/2016 | Forgeron et al. |
| 2016/0107939 A1 | 4/2016 | Monkman et al. |
| 2016/0185662 A9 | 6/2016 | Niven et al. |
| 2016/0272542 A1 | 9/2016 | Monkman |
| 2016/0280610 A1 | 9/2016 | Forgeron et al. |
| 2016/0340253 A1 | 11/2016 | Forgeron et al. |
| 2016/0355441 A1 | 12/2016 | Tregger et al. |
| 2016/0355442 A1 | 12/2016 | Niven et al. |
| 2017/0015598 A1 | 1/2017 | Monkman et al. |
| 2017/0028586 A1 | 2/2017 | Jordan et al. |
| 2017/0036372 A1 | 2/2017 | Sandberg et al. |
| 2017/0043499 A1 | 2/2017 | Forgeron et al. |
| 2017/0158549 A1 | 6/2017 | Yamada et al. |
| 2017/0158569 A1 | 6/2017 | Lee et al. |
| 2017/0165870 A1 | 6/2017 | Niven et al. |
| 2017/0217047 A1 | 8/2017 | Leon et al. |
| 2018/0118622 A1 | 5/2018 | Monkman et al. |

FOREIGN PATENT DOCUMENTS

| | | |
|---|---|---|
| CA | 970935 A1 | 7/1975 |
| CA | 1045073 A | 12/1978 |
| CA | 1185078 A1 | 4/1985 |
| CA | 2027216 A1 | 4/1991 |
| CA | 2343021 A1 | 3/2000 |
| CA | 2362631 A1 | 8/2000 |
| CA | 2598583 A1 | 9/2006 |
| CA | 2646462 A1 | 9/2007 |
| CA | 2630226 A1 | 10/2008 |
| CA | 2659447 A1 | 12/2008 |
| CA | 2703343 A1 | 4/2009 |
| CA | 2705857 A1 | 5/2009 |
| CA | 2670049 A1 | 11/2009 |
| CA | 2668249 A1 | 12/2009 |
| CA | 2778508 A1 | 6/2011 |
| CA | 2785143 A1 | 7/2011 |
| CA | 2501329 C | 6/2012 |
| CA | 2829320 A1 | 9/2012 |
| CA | 2837832 A1 | 12/2012 |
| CN | 2055815 U | 4/1990 |
| CN | 1114007 A | 12/1995 |
| CN | 1267632 A | 9/2000 |
| CN | 2445047 Y | 8/2001 |
| CN | 1357506 A | 7/2002 |
| CN | 2575406 Y | 9/2003 |
| CN | 2700294 Y | 5/2005 |
| CN | 2702958 Y | 6/2005 |
| CN | 2748574 Y | 12/2005 |
| CN | 1735468 A | 2/2006 |
| CN | 1916332 A | 2/2007 |
| CN | 2893360 Y | 4/2007 |
| CN | 2913278 Y | 6/2007 |
| CN | 200961340 Y | 10/2007 |
| CN | 101099596 A | 1/2008 |
| CN | 101319512 A | 12/2008 |
| CN | 101538813 A | 9/2009 |
| CN | 101551001 A | 10/2009 |
| CN | 201325866 Y | 10/2009 |
| DE | 1817001 A1 | 11/1970 |
| DE | 3139107 A1 | 4/1983 |
| DE | 19506411 A1 | 8/1996 |
| DE | 20305552 U1 | 10/2003 |
| EP | 0047675 A1 | 3/1982 |
| EP | 0218189 A2 | 4/1987 |
| EP | 0151164 B1 | 5/1988 |
| EP | 0218189 A3 | 5/1988 |
| EP | 0629597 A1 | 12/1994 |
| EP | 0573524 B1 | 5/1996 |

(56) References Cited

FOREIGN PATENT DOCUMENTS

| | | |
|---|---|---|
| EP | 0701503 B1 | 8/2000 |
| EP | 1429096 A2 | 6/2004 |
| EP | 1785245 A1 | 5/2007 |
| EP | 2012149 A1 | 1/2009 |
| EP | 2012150 A1 | 1/2009 |
| EP | 2039589 A1 | 3/2009 |
| EP | 2040135 A2 | 3/2009 |
| EP | 2042326 A2 | 4/2009 |
| EP | 2043169 A2 | 4/2009 |
| EP | 2048525 A1 | 4/2009 |
| EP | 2096498 A1 | 9/2009 |
| EP | 2098362 A1 | 9/2009 |
| EP | 2116841 A1 | 11/2009 |
| EP | 2123700 A1 | 11/2009 |
| EP | 2123942 B1 | 4/2011 |
| EP | 2123465 B1 | 7/2011 |
| EP | 2042317 B1 | 8/2011 |
| EP | 2162639 B1 | 9/2011 |
| EP | 2162640 B1 | 9/2011 |
| EP | 2042535 B1 | 10/2011 |
| EP | 2042324 B1 | 6/2012 |
| EP | 2039393 B1 | 8/2012 |
| EP | 1749629 B1 | 5/2013 |
| EP | 2123441 B1 | 7/2013 |
| EP | 2107000 B1 | 9/2013 |
| EP | 2031010 B1 | 4/2014 |
| EP | 2123808 B1 | 5/2014 |
| EP | 2036952 B1 | 4/2016 |
| EP | 3013544 A1 | 5/2016 |
| EP | 1985754 B1 | 8/2016 |
| ES | 2140302 A1 | 2/2000 |
| FR | 1259819 A | 4/1961 |
| FR | 2121975 A5 | 8/1972 |
| FR | 2281815 A1 | 3/1976 |
| FR | 2503135 A1 | 10/1982 |
| FR | 2513932 A1 | 4/1983 |
| FR | 2735804 A1 | 12/1996 |
| GB | 217791 A | 6/1924 |
| GB | 574724 A | 1/1946 |
| GB | 644615 A | 10/1950 |
| GB | 851222 A | 10/1960 |
| GB | 1167927 A | 10/1969 |
| GB | 1199069 A | 7/1970 |
| GB | 1337014 A | 11/1973 |
| GB | 1460284 A | 12/1976 |
| GB | 1549633 A | 8/1979 |
| GB | 2106886 A | 4/1983 |
| GB | 2192392 A | 1/1988 |
| GB | 2300631 A | 11/1996 |
| GB | 2302090 A | 1/1997 |
| GB | 2392502 A | 3/2004 |
| JP | S56115423 A | 9/1981 |
| JP | S5850197 A | 3/1983 |
| JP | S60187354 A | 9/1985 |
| JP | S6150654 A | 3/1986 |
| JP | S62122710 A | 6/1987 |
| JP | S6426403 A | 1/1989 |
| JP | H0218368 A | 1/1990 |
| JP | H0254504 U | 4/1990 |
| JP | H05116135 A | 5/1993 |
| JP | H05117012 A | 5/1993 |
| JP | H0624329 A | 2/1994 |
| JP | H06144944 A | 5/1994 |
| JP | H06263562 A | 9/1994 |
| JP | H0748186 A | 2/1995 |
| JP | H07275899 A | 10/1995 |
| JP | H0835281 A | 2/1996 |
| JP | H0960103 A | 3/1997 |
| JP | H09124099 A | 5/1997 |
| JP | H10194798 A | 7/1998 |
| JP | H11303398 A | 11/1999 |
| JP | H11324324 A | 11/1999 |
| JP | 2000203964 A | 7/2000 |
| JP | 2000247711 A | 9/2000 |
| JP | 2000281467 A | 10/2000 |
| JP | 2002012480 A | 1/2002 |
| JP | 2002127122 A | 5/2002 |
| JP | 2003326232 A | 11/2003 |
| JP | 2005023692 A | 1/2005 |
| JP | 2005273720 A | 10/2005 |
| JP | 2007326881 A | 12/2007 |
| JP | 2008096409 A | 4/2008 |
| JP | 2009115209 A | 5/2009 |
| JP | 4313352 B2 | 8/2009 |
| KR | 20020006222 A | 1/2002 |
| KR | 20020042569 A | 6/2002 |
| KR | 20020090354 A | 12/2002 |
| KR | 20030004243 A | 1/2003 |
| KR | 20060064557 A | 6/2006 |
| KR | 100766364 B1 | 10/2007 |
| NZ | 183790 A | 9/1980 |
| RU | 2168412 C2 | 6/2001 |
| RU | 2212125 C2 | 9/2003 |
| RU | 2351469 C2 | 4/2009 |
| SE | 8002613 L | 3/1982 |
| SE | 451067 B | 8/1987 |
| SU | 1031728 A2 | 7/1983 |
| TW | I257330 B | 7/2006 |
| WO | WO-7900473 A1 | 7/1979 |
| WO | WO-8500587 A1 | 2/1985 |
| WO | WO-9105644 A1 | 5/1991 |
| WO | WO-9215753 A1 | 9/1992 |
| WO | WO-9319347 A1 | 9/1993 |
| WO | WO-9427797 A1 | 12/1994 |
| WO | WO-0190020 A2 | 11/2001 |
| WO | WO-2004033793 A2 | 4/2004 |
| WO | WO-2004074733 A1 | 9/2004 |
| WO | WO-2005025768 A1 | 3/2005 |
| WO | WO-2006040503 A1 | 4/2006 |
| WO | WO-2006100550 A1 | 9/2006 |
| WO | WO-2006100693 A1 | 9/2006 |
| WO | WO-2008149389 A1 | 12/2008 |
| WO | WO-2008149390 A1 | 12/2008 |
| WO | WO-2009078430 A1 | 6/2009 |
| WO | WO-2009089906 A1 | 7/2009 |
| WO | WO-2009132692 A1 | 11/2009 |
| WO | WO-2010074811 A1 | 7/2010 |
| WO | WO-2012079173 A1 | 6/2012 |
| WO | WO-2012081486 A1 | 6/2012 |
| WO | WO-2013011092 A1 | 1/2013 |
| WO | WO-2014021884 A1 | 2/2014 |
| WO | WO-2014026794 A1 | 2/2014 |
| WO | WO-2014063242 A1 | 5/2014 |
| WO | WO-2014121198 A1 | 8/2014 |
| WO | WO-2014205577 A1 | 12/2014 |
| WO | WO-2015123769 A1 | 8/2015 |
| WO | WO-2015/154174 | 10/2015 |
| WO | WO-2015154162 A1 | 10/2015 |
| WO | WO-2016041054 A1 | 3/2016 |
| WO | WO-2016082030 | 6/2016 |
| WO | WO-2016082030 A1 | 6/2016 |
| WO | WO-2017000075 A1 | 1/2017 |
| WO | WO-2017041176 | 3/2017 |
| WO | WO-2017177324 A1 | 10/2017 |

OTHER PUBLICATIONS

International Search Report and Written Opinion dated Aug. 30, 2016 for International application No. PCT/CA2016/050773.
International Search Report and Written Opinion dated Oct. 19, 2016 for International Application No. PCT/CA2016/051062.
Kim, et al. Properties of cement-based mortars substituted by carbonated fly ash and carbonated under supercritical conditions. IJAER. 9(24), 25525-25534 (2014).
Notice of Allowance dated Dec. 21, 2016 for U.S. Appl. No. 15/161,927.
Office Action dated Nov. 3, 2016 for U.S. Appl. No. 15/161,927.
Office Action dated Dec. 29, 2016 for U.S. Appl. No. 15/157,205.
Office Action dated Dec. 30, 2016 for U.S. Appl. No. 13/994,681.
Co-pending U.S. Appl. No. 15/911,573, filed Mar. 5, 2018.
Co-pending U.S. Appl. No. 15/649,339, filed Jul. 13, 2017.
Co-pending U.S. Appl. No. 15/828,240, filed Nov. 30, 2017.

(56) References Cited

OTHER PUBLICATIONS

Co-pending U.S. Appl. No. 62/083,784, filed Nov. 24, 2014.
Co-pending U.S. Appl. No. 62/086,024, filed Dec. 1, 2014.
Co-pending U.S. Appl. No. 62/146,103, filed Apr. 10, 2015.
Co-pending U.S. Appl. No. 62/160,350, filed May 12, 2015.
Co-pending U.S. Appl. No. 62/165,670, filed May 22, 2015.
Co-pending U.S. Appl. No. 62/215,481, filed Sep. 8, 2015.
Co-pending U.S. Appl. No. 62/240,843, filed Oct. 13, 2015.
Co-pending U.S. Appl. No. 62/321,013, filed Apr. 11, 2016.
Co-pending U.S. Appl. No. 62/522,510, filed Jun. 20, 2017.
Co-pending U.S. Appl. No. 62/554,830, filed Sep. 6, 2017.
Co-pending U.S. Appl. No. 62/558,173, filed Sep. 13, 2017.
Co-pending U.S. Appl. No. 62/559,771, filed Sep. 18, 2017.
Co-pending U.S. Appl. No. 62/560,311, filed Sep. 19, 2017.
Co-pending U.S. Appl. No. 62/570,452, filed Oct. 10, 2017.
Co-pending U.S. Appl. No. 62/573,109, filed Oct. 16, 2017.
Co-pending U.S. Appl. No. 62/652,385, filed Apr. 4, 2018.
Co-pending U.S. Appl. No. 62/675,615, filed May 23, 2018.
Co-pending U.S. Appl. No. 61/423,354, filed Sep. 15, 2010.
Co-pending U.S. Appl. No. 61/760,319, filed Feb. 4, 2013.
Co-pending U.S. Appl. No. 61/976,360, filed Apr. 7, 2014.
Co-pending U.S. Appl. No. 61/980,505, filed Apr. 16, 2014.
EP15862209.2 Partial Supplementary European Search Report dated Jun. 20, 2018.
European search report dated Nov. 7, 2017 for EP Application No. 15776706.
European search report with written opinion dated Nov. 14, 2017 for EP Application No. 15777459.
European search report with written opinion dated Nov. 29, 2017 for EP15780122.
Le et al. Hardened properties of high-performance printing concrete. Cement and Concrete Research, vol. 42, No. 3, Mar. 31, 2012, pp. 558-566.
Mass. Premixed Cement Paste. Concrete International 11(11):82-85 (Nov. 1, 1989).
Office action dated Oct. 19, 2017 for U.S. Appl. No. 15/228,964.
PCT Application No. PCT/CA2014/050611 as filed Jun. 25, 2014.
Younsi, et al. Performance-based design and carbonation of concrete with high fly ash content. Cement and Concrete Composites, Elsevier Applied Science, Barking, GB, vol. 33, No. 1, Jul. 14, 2011. pp. 993-1000.
Co-pending U.S. Appl. No. 15/650,524, filed Jul. 14, 2017.
Co-pending U.S. Appl. No. 15/659,334, filed Jul. 25, 2017.
European search report with written opinion dated Feb. 2, 2017 for EP2951122.
European search report with written opinion dated Jan. 20, 2017 for EP14818442.
International search report with written opinion dated Jun. 15, 2017 for PCT/CA2017/050445.
International search report with written opinion dated Jul. 3, 2016 for PCT/CA2015/050195.
Notice of allowance dated Apr. 14, 2017 for U.S. Appl. No. 15/157,205.
Notice of allowance dated Apr. 24, 2017 for U.S. Appl. No. 15/161,927.
Notice of allowance dated Jun. 15, 2017 for U.S. Appl. No. 15/157,205.
Notice of allowance dated Jun. 22, 2017 for U.S. Appl. No. 15/161,927.
Notice of allowance dated Jun. 30, 2017 for U.S. Appl. No. 15/434,429.
Notice of allowance dated Jul. 28, 2017 for U.S. Appl. No. 15/434,429.
Notice of allowance dated Aug. 2, 2017 for U.S. Appl. No. 15/161,927.
Office action dated Feb. 27, 2017 for U.S. Appl. No. 14/171,350.
Office action dated Mar. 7, 2017 for U.S. Appl. No. 15/434,429.
Office action dated Mar. 14, 2017 for U.S. Appl. No. 15/228,964.
Office action dated May 10, 2017 for U.S. Appl. No. 13/994,681.
Office action dated Jul. 3, 2017 for U.S. Appl. No. 14/171,350.
Yelton, R. Treating Process Water. The Concrete Producer. pp. 441-443. Jun. 1, 1997.

Abanades, et al. Conversion limits in the reaction of CO2 with lime. Energy and Fuels. 2003; 17(2):308-315.
Author Unknown, "Splicing Solution," Quarry Management, Oct. 2002, 3 pages.
Bhatia, et al. Effect of the Product Layer on the kinetics of the CO2-lime reaction. AIChE Journal. 1983; 29(1):79-86.
Chang, et al. The experimental investigation of concrete carbonation depth. Cement and Concrete Research. 2006; 36(9):1760-1767.
Chen, et al. On the kinetics of Portland cement hydration in the presence of selected chemical admixtures. Advances in Cement Research. 1993; 5(17):9-13.
"Clear Edge Filtration—Screen and Filter, Process Belts, and Screen Print," Mining-Techology.com, no date, [retrieved on May 25, 2010]. Retrieved from: http/www.mining-technology.com/contractors/filtering/clear-edge/, 2 pages.
Co-pending U.S. Appl. No. 15/170,018, filed Jun. 1, 2016.
Co-pending U.S. Appl. No. 15/184,219, filed Jun. 16, 2016.
Co-pending U.S. Appl. No. 15/228,964, filed Aug. 4, 2016.
Co-pending U.S. Appl. No. 62/096,018, filed Dec. 23, 2014.
Co-pending U.S. Appl. No. 61/839,312, filed Jun. 25, 2013.
Co-pending U.S. Appl. No. 61/847,254, filed Jul. 17, 2013.
Co-pending U.S. Appl. No. 61/879,049, filed Sep. 17, 2013.
Co-pending U.S. Appl. No. 61/925,100, filed Jan. 8, 2014.
Co-pending U.S. Appl. No. 61/938,063, filed Feb. 10, 2014.
Co-pending U.S. Appl. No. 61/941,222, filed Feb. 18, 2014.
Co-pending U.S. Appl. No. 61/992,089, filed May 12, 2014.
Dewaele, et al. Permeability and porosity changes associated with cement grout carbonation. Cement and Concrete Research. 1991; 21(4):441-454.
Dorbian "Nova Scotia-based CArbonCure garners $3.5 min in Series B funds," Reuters PE HUB, Dec. 11, 2013, 6 pages, found at http://www.pehub.com/2013/12/nova-scotia-based-carboncure-garners-3-5-mln-in-series-b-funds/.
Estes-Haselbach. The greenest concrete mixer—carbon sequestration in freshly mixed concrete. Sep. 25, 2012.
Eurpoean search report and search opinion dated Jan. 14, 2015 for EP 11849437.6.
Fernandez-Bertos, et al. A review of accelerated carbonation technology in the treatment of cement-based materials and sequestration of CO2. Journal of Hazardous Materials B112. 2004; 193-205.
Fluid Hole and Size. Newton: Ask a Scientist. Jan. 24, 2005. Retrieved from http://www.newton.dep.anl.gov/askasci/eng99/eng99365.htm on Jul. 13, 2013.
Freedman, S. Carbonation Treatment of Concrete Masonry Units. Modern Concrete. 1969; 33(5):33-6.
Gager, "Trumbull Corp.: CHARLEROI Lock & Dam," Construction Today, 2010, [retrieved on May 25, 2010]. Retrieved from http://www.construction-today.com/cms1/content/view/1909/104/, 2 pages.
"Glenium® 3400 NV: High-Range Water-Reducing Admixture," BASF, Product Data, Jun. 2010, 2 pages.
Goodbrake, et al. Reaction of Hydraulic Calcium Silicates with Carbon Dioxide and Water. Journal of the American Ceramic Society. 1979; 62(9-10):488-491.
Goto, et al. Calcium Silicate Carbonation Products. Journal of the American Ceramic Society. 1995; 78(11):2867-2872.
Goto. Some mineralo-chemical problems concerning calcite and aragonite, with special reference to the genesis of aragonite. Contribution from the department of geology and mineralogy. Faculty of Science. Hokkaido University. 1961. http://eprints.lib.hokudai.ac.jp/dspace/bitstream/2115/35923/1/10(4)_571-640.pdf.
Hesson, et al. Flow of two-phase carbon dioxide through orifices. AIChE Journal 4.2 (1958): 207-210.
Huijgen, et al. Mineral CO2 sequestration by steel slag carbonation. Environmental Science and Technology. 2005; 39(24):9676-9682.
Huntzinger, et al. Carbon dioxide sequestration in cement kiln dust through mineral carbonation. Environ Sci Technol. Mar. 15, 2009;43(6):1986-92.
Hurst. Canadian cement plant becomes first to capture CO2 in algae. Earth and Industry. Pond Biofuels press release. Mar. 19, 2010.

(56) References Cited

OTHER PUBLICATIONS

Iizuka, et al. Development of a new CO2 sequestration process utilizing the carbonation of waste cement. Industrial & Engineering Chemistry Research. 2004; (43)24:7880-7887.
International search report and written opinion dated Jan. 25, 2016 for PCT Application No. PCTCA2015/051220.
International search report and written opinion dated Mar. 6, 2012 for PCT Application No. CA2011/050774.
International search report and written opinion dated May 4, 2015 for PCT/CA2015/050118.
International search report and written opinion dated Jul. 16, 2015 for PCT Application No. PCT/CA2015/000158.
International search report and written opinion dated Jul. 16, 2015 for PCT Application No. PCT/CA2015/050318.
International search report and written opinion dated Jul. 18, 2013 for PCT Application No. CA2013/050190.
International search report and written opinion dated Sep. 18, 2014 for PCT/CA2014/050611.
International search report dated May 16, 2014 for PCT Application No. PCT/US14/14447.
Kashef-Haghighi, et al. Accelerated Concrete Carbonation, a CO2 Sequestration Technology. 8th World Congress of Chemical Engineering WCCE8. Aug. 24, 2009.
Kashef-Haghighi, et al. CO2 sequestration in concrete through accelerated carbonation curing in a flow-through reactor. Ind. Eng. Chem. Res. 2010; 49:1143-1149.
Kawashima, et al. Dispersion of CaCO3 Nanoparticles by Sonication and Surfactant Treatment for Application in Fly Ash-Cement Systems. Materials and Structures. May 28, 2013. DOI 10.1617/S11527-013-0110-9.
Lange, et al. Preliminary investigation into the effects of carbonation on cement-solidified hazardous wastes. Environmental Science and Technology. 1996; 30(1):25-30.
Logan, C. Carbon dioxide absorption and durability of carbonation cured cement and concrete compacts. Thesis. Department of Civil Engineering, McGill University. Montreal, QC, Canada. 2006.
Lomboy, et al. Atom Probe Tomography for Nanomodified Portland Cement. Nanotechnology in Construction. Springer International Publishing, 2015. 79-86.
"MB-AETM 90: Air-Entraining Admixture" BASF, Product Data, Apr. 11, 2 pages, found at http://www.basf-admixtures.com/en/products/airentraining/mbae_90/Pages/default.aspx.
Mehta. "Concrete Carbonation". Materials World Magazine. Oct. 1, 2008 [Retrieved on Jul. 13, 2013] Retrieved from http://www.iom3.org/news/concrete-carbonation.
Monkman, et al. Assessing the Carbonation Behavior of Cementitious Materials. J. Mater. Civ. Eng. 2006; 18(6), 768-776.
Monkman, et al. Carbonated Ladle Slag Fines for Carbon Uptake and Sand Substitute. Journal of Materials in Civil Engineering. Nov. 2009;657-665.
Monkman, et al. Carbonation Curing of Slag-Cement Concrete for Binding CO2 and Improving Performance. Journal of Materials in Civil Engineering. Apr. 2010; 296-304.
Monkman, et al. Integration of carbon sequestration into curing process of precast concrete. Can. J. Civ. Eng. 2010; 37:302-310.
Monkman, G. S. Investigating Carbon Dioxide Sequestration in Fresh Ready Mixed Concrete. International Symposium on Environmentally Friendly Concrete—ECO-Crete Aug. 13-15, 2014, Reykjavik, Iceland.
Monkman, S. Maximizing carbon uptake and performance gain in slag-containing concretes through early carbonation. Thesis. Department of Civil Engineering and Applied Mechanics, McGill University. Montreal, QC, Canada. 2008.
Niven, et al. Carbon Dioxide Uptake Rate and Extent during Accelerated Curing of Concrete. International Congress on the Chemistry of Cement 2007. ICCC 2007.
Niven. Industrial pilot study examining the application of precast concrete carbonation curing. Cardon Sense Solutions Inc. Halifax, Canada. ACEME 2008.
Niven. Physiochemical investigation of CO2 accelerated concrete curing as a greenhosue gas mitigation technology. Theses from the Department of Civil Engineering and Applied Mechanics. McGill University, Montreal, Canada. Oct. 2006.
Notice of allowance dated Feb. 26, 2016 for U.S. Appl. No. 14/642,536.
Notice of allowance dated Mar. 29, 2016 for U.S. Appl. No. 14/701,456.
Notice of allowance dated Apr. 22, 2014 for U.S. Appl. No. 13/660,447.
Notice of allowance dated Apr. 24, 2015 for U.S. Appl. No. 14/249,308.
Notice of allowance dated Apr. 25, 2016 for U.S. Appl. No. 14/642,536.
Notice of allowance dated May 6, 2016 for U.S. Appl. No. 14/796,751.
Notice of allowance dated May 11, 2016 for U.S. Appl. No. 14/701,456.
Notice of allowance dated Jun. 24, 2015 for U.S. Appl. No. 14/249,308.
Notice of allowance dated Jul. 5, 2016 for U.S. Appl. No. 14/282,965.
Notice of allowance dated Aug. 5, 2016 for U.S. Appl. No. 14/796,751.
Notice of allowance dated Aug. 16, 2016 for U.S. Appl. No. 14/796,751.
Notice of allowance dated Sep. 14, 2016 for U.S. Appl. No. 14/796,751.
Notices of allowance dated Mar. 3, 2016 and Mar. 17, 2016 for U.S. Appl. No. 14/701,456.
Office action dated Jan. 25, 2016 for U.S. Appl. No. 14/701,456.
Office action dated Mar. 7, 2016 for U.S. Appl. No. 14/796,751.
Office action dated Mar. 10, 2015 for U.S. Appl. No. 14/249,308.
Office action dated Mar. 28, 2013 for U.S. Appl. No. 13/660,447.
Office action dated Apr. 26, 2016 for U.S. Appl. No. 14/950,288.
Office Action dated Jun. 16, 2016 for U.S. Appl. No. 13/994,681.
Office action dated Jul. 15, 2013 for U.S. Appl. No. 13/660,447.
Office action dated Jul. 30, 2015 for U.S. Appl. No. 14/282,965.
Office action dated Aug. 12, 2016 for U.S. Appl. No. 14/950,288.
Office action dated Aug. 14, 2015 for U.S. Appl. No. 14/701,456.
Office action dated Aug. 18, 2015 for U.S. Appl. No. 14/642,536.
Office action dated Aug. 22, 2016 for U.S. Appl. No. 15/161,927.
Office action dated Sep. 2, 2016 for U.S. Appl. No. 15/228,964.
Office action dated Sep. 28, 2016 for U.S. Appl. No. 15/157,205.
Office action dated Oct. 5, 2015 for U.S. Appl. No. 14/701,456.
Office action dated Dec. 2, 2015 for U.S. Appl. No. 14/282,965.
Office action dated Dec. 7, 2015 for U.S. Appl. No. 14/796,751.
Papadakis, et al. A reaction engineering approach to the problem of concrete carbonation. AIChE Journal. 1989; 35(10):1639-1650.
Papadakis, et al. Fundamental Modeling and Experimental Investigation of Concrete Carbonation. ACI Materials Journal. 1991; 88(4):363-373.
Phipps and MacDonald. Sustainability Leads to Durability in the New I-35W Bridge. Concrete International. Feb. 2009; vol. 31 Issue 2, p. 27-32.
"Pozzolith® 200N: Water-Reducing Admixture," BASF, Product Data, Sep. 2010, 2 pages, found at http://www.basf-admixtures.com/en/products/waterreducingretarding/pozzolith200n/Pages/default.aspx.
"Pozzolitho® 322 N: Water-Reducing Admixture," BASF, Product Data, Mar. 2007, 2 pages.
Preliminary Amendment dated Nov. 1, 2013 for U.S. Appl. No. 13/994,681.
Reardon, et al. High pressure carbonation of cementitious grout. Cement and Concrete Research. 1989; 19(3):385-399.
Sato, et al. Effect of Nano-CaCO3 on Hydration of Cement Containing Supplementary Cementitious Materials. Institute for Research in Construction, National Research Council Canada. Oct. 2010.
Sato, et al. Seeding effect of nano-CaCO3 on the hidration of tricalcium silicate, Transportation Research Record. 2010; 2141:61-67.
Shao, et al. A new CO2 sequestration process via concrete products production. Department of civil engineering. McGill University, Montreal, Canada. 2007.
Shao, et al. CO2 sequestration using calcium-silicate concrete. Canadian Journal of Civil Engineering. 2006;(33)6:776-784.

(56) References Cited

OTHER PUBLICATIONS

Shao, et al. Market analysis of CO2 sequestration in concrete building products. Second International Conference on Sustainable Construction Materials and Technologies. Jun. 28-30, 2010.
Shao, et al. Recycling carbon dioxide into concrete: a feasibility study. Concrete Sustainability Conference. 2010.
Shi, et al. Studies on some factors affecting CO2 curing of lightweight concrete products. Resources, Conservation and Recycling. 2008; (52)8-9:1087-1092.
Shideler, J. Investigation of the moisture-volume stability of concrete masonry units. Portland Cement Association. 1955. (D3).
Shih, et al. Kinetics of the reaction of Ca(OH)2 with CO2 at low temperature. Industrial and Engineering Chemistry Research. 1999; 38(4):1316-1322.
Sorochkin, et al. Study of the possibility of using carbon dioxide for accelerating the hardening of products made from Portland Cement. J. Appl. Chem. USSR. 1975; 48:1271-1274.
Steinour, H. Some effects of carbon dioxide on mortars and concrete-discussion. Journal of the American Concrete Institute. 1959; 30:905-907.
Technology Roadmap: Cement. International Energy Agency. Dec. 2009 [Retrieved on Jul. 13, 2013]. Retrieved from http://www.iea.org/publications/freepublications/publication/name,3861,en.html.
Teir, et al. Carbonation of Finnish magnesium silicates for CO2 sequestration . Fifth Annual Conference on Carbon Capture and Sequestration. May 8-11, 2006. National Energy Technology Laboratory, Department of Energy, USA.
The Vince Hagan Co., "Stationary, Radial Stacking, and Wet Belt Converyors—Product Brochure," 4 pages.
Toennies, et al. Artificial carbonation of concrete masonry units. American Concrete Institute Journal. 1960; 31(8):737-755.
Tri-Cast literature, Besser Company. Sioux, Iowa, USA.
U.S. Appl. No. 13/660,447, filed Oct. 25, 2012.
U.S. Appl. No. 13/994,681, filed Jun. 14, 2013.
U.S. Appl. No. 14/249,308, filed Apr. 9, 2014.
U.S. Appl. No. 14/282,965, filed May 20, 2014.
U.S. Appl. No. 14/642,536, filed Mar. 9, 2015.
U.S. Appl. No. 14/701,456, filed Apr. 30, 2015.
U.S. Appl. No. 14/796,751, filed Jul. 10, 2015.
U.S. Appl. No. 14/950,288, filed Nov. 24, 2015.
U.S. Appl. No. 61/839,312, filed Jun. 25, 2013.
U.S. Appl. No. 61/847,254, filed Jul. 17, 2013.
U.S. Appl. No. 61/879,049, filed Sep. 17, 2013.
U.S. Appl. No. 61/925,100, filed Jan. 8, 2014.
U.S. Appl. No. 61/938,063, filed Feb. 10, 2014.
U.S. Appl. No. 61/941,222, filed Feb. 18, 2014.
U.S. Appl. No. 61/976,360, filed Apr. 7, 2014.
U.S. Appl. No. 61/980,505, filed Apr. 16, 2014.
Van Balen, K. Carbonation reaction of lime, kinetics at ambient temperature. Cement and Concrete Research. 2005; 35(4):647-657.
Venhuis, et al. Vacuum method for carbonation of cementitious wasteforms. Environ Sci Technol. Oct. 15, 2001;35(20):4120-5.
Weber, et al. Find carbon dioxide gas under pressure an efficient curing agent for cast stone. Concrete. Jul. 1941; 33-34.
Young, et al. Accelerated Curing of Compacted Calcium Silicate Mortars on Exposure to CO2. Journal of the American Ceramic Society . . . 1974; 57(9):394-397.
Co-pending U.S. Appl. No. 16/155,013, filed Oct. 9, 2018.
PCT/CA2018/050750 International Search Report and Written Opinion dated Sep. 6, 2018.
EP15862209.2 Extended European Search Report dated Oct. 8, 2018.
U.S. Appl. No. 15/170,018 Office Action dated Oct. 16, 2018.
U.S. Appl. No. 15/184,219 Office Action dated Oct. 16, 2018.

\* cited by examiner

CARBONATION OF CEMENT MIXES

CROSS-REFERENCE

This application is a continuation of Application No. PCT/CA2015/050118, filed Feb. 18, 2015, which claims the benefit of U.S. Provisional Application No. 61/941,222, filed Feb. 18, 2014, and of U.S. Provisional Application No. 62/096,018, filed Dec. 23, 2014, all of which applications are incorporated herein by reference.

BACKGROUND OF THE INVENTION

Building materials containing cementing material comprising calcium or calcium ions, e.g., hydraulic cement mixes, such as concrete mixes, are used in a multitude of compositions and procedures throughout the world. In addition, greenhouse gases such as carbon dioxide are a growing concern worldwide. There is a need for methods and compositions to contact building materials containing cementing materials comprising calcium or calcium ions, e.g., hydraulic cement mixes with carbon dioxide and for hydraulic cement mixes containing incorporated carbon dioxide and carbonation products.

SUMMARY OF THE INVENTION

In one aspect the invention provides methods. In certain embodiments, the invention provides a method of carbonating concrete comprising i) pumping a wet concrete mix into a conduit at a pressure sufficient to move the concrete through the conduit at a desired rate; and, ii) introducing carbon dioxide into the conduit at a pressure at or above the pressure of i). In certain embodiments, the pressure is greater than 50 psi. In certain embodiments, the carbon dioxide is transported to the conduit in liquid form and released into the conduit under conditions whereby the carbon dioxide becomes gaseous and solid in the conduit. In certain embodiments, the conduit provides a variable pressure down its length, for example, the variable pressure can be provided by the presence of at least one constricted section in the conduit, or the variable pressure can be provided by a plurality of constricted sections in the conduit which alternate with expanded sections, or the variable pressure can be provided by varying the rate of pumping of concrete into the conduit, or the variable pressure can be provided by pumping the concrete at a constant rate at the proximal end of the conduit and varying the size of an orifice at the distal end of the conduit. In certain embodiments, the method further comprises adding an admixture to the concrete to improve flowability, early strength, or both. In certain embodiments, the method further comprises determining one or more characteristics of the wet concrete mix, the conduit, or the area around the conduit, such temperature or carbon dioxide concentration. The rate of introduction of carbon dioxide can be adjusted based on the characteristic.

In another aspect, the invention provides compositions. In certain embodiments, the invention provides an apparatus for moving wet concrete mix from a first area to a second area and adding carbon dioxide to the mix comprising i) a container for holding mixed wet concrete in the first area; ii) a conduit operably connected to the container and extending to the second area; iii) a system for providing pressure to the concrete to move it from the container, into the conduit at a proximal end of the conduit, and out of the conduit at a distal end into the second area: iv) a system for supplying carbon dioxide operably connected to the system of iii) or the conduit of ii) configured to introduce carbon dioxide under pressure to the mixed wet concrete so that the carbon dioxide mixes with the concrete passing through the conduit. In certain embodiments, the carbon dioxide is liquid carbon dioxide. In certain embodiments, the system for supplying carbon dioxide is configured to introduce the liquid carbon dioxide to the conduit in such a manner that the carbon dioxide becomes solid and gaseous carbon dioxide. In certain embodiments, the system for supplying carbon dioxide is configured to introduce the carbon dioxide at a pressure of at least 50 psi into the conduit. In certain embodiments, the conduit comprises at least one constricted area to decrease the pressure of the concrete/carbon dioxide mixture flowing through the constricted area. In certain embodiments, the conduit comprises a plurality of constricted areas alternating with expanded areas to provide areas of alternating decreasing and increasing pressure to the concrete/carbon dioxide mixture flowing through the conduit. In certain embodiments, the system for providing pressure to the concrete is configured to provide variable pressure to the concrete as it is pumped through the conduit. In certain embodiments, the distal end of the conduit comprises an orifice or valve, wherein the orifice or valve is configured to provided a variable size so as to vary the pressure of the concrete/carbon dioxide mixture in the conduit. In certain embodiments, the apparatus further comprises a system for adding admixture to the wet concrete mix, wherein the system for adding admixture is operably connected to the container of i), the conduit of ii), or the system for providing pressure of iii), or a combination thereof. In certain embodiments, the system for providing pressure comprises a boom pump, a line pump, or a skid or rail pump. In certain embodiments, the apparatus further comprises a sensor for sensing a characteristic of the concrete mix, the conduit, or an area around the conduit, wherein the sensor is operably connected to the system for supplying carbon dioxide of iv), such as a sensor that detects carbon dioxide or temperature.

In certain embodiments the invention provides a conduit for transporting a wet concrete mixture from a first area to a second area, wherein the conduit comprises at least one constricted area so that the concrete flowing through the conduit experiences a reduced pressure as it flows through the restricted area. In certain embodiments, the conduit comprises a plurality of restricted areas alternating with expanded areas so that the concrete flowing through the conduit experiences alternating reduced and increased pressures as it flows through the conduit.

In certain embodiments the invention provides a conduit for transporting a wet concrete mixture from a first area to a second area, wherein the conduit comprises a proximal end at the first area and a distal end at the second area, wherein the distal end of the conduit is configured to provide an orifice or valve for the exit of the concrete of variable size.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

The invention provides methods and compositions for adding carbon dioxide under pressure to a cement mix before the mix sets. For convenience, the invention is described in terms of concrete, but it will be understood that the description applies to any mix comprising a cementing material comprising calcium or calcium ions, to which carbon dioxide may be added to produce calcium carbonate.

Wet concrete, which is a mixture that includes hydraulic cement, water, and aggregate, is often pumped from one location to another, greatly simplifying and increasing the efficiency of, e.g., a concrete pour. The concrete is provided in mixed form, generally via one or more ready mix trucks which typically deposit wet concrete mix into a hopper, and pumped from the hopper via a conduit from one area to a second area; typically the first area is fixed for at least part of the pour and the second area can be varied as the conduit is moved to provide an even pour at a particular job site. Typical pumps include boom pumps, line pumps, and skid or rail pumps. The concrete is pumped into a conduit. e.g., a flexible hose, at its proximal end under pressure sufficient to move it to the distal end of the conduit at the desired rate, where it is discharged.

The invention provides methods and compositions for introducing carbon dioxide under pressure into a closed system comprising concrete, such as into the concrete that moves through the conduit so that the carbon dioxide mixes and reacts with the moving concrete mix to produce carbonated concrete, which is then discharged from the conduit. In some cases the invention provides methods and compositions for increasing $CO_2$ uptake efficiency and/or manipulating precipitation products in carbonated hydraulic cement mixes in a closed system via modified pressure environments. The concrete can be considered to have a residence time in the conduit dictated by how long a distinct mass of concrete takes to travel from the pump to the exit of the conduit. The carbon dioxide reacts with the cement to form stable carbonate reaction products (e.g., reacting with the $Ca^{2+}$ ions from the anhydrous cement to form $CaCO_3$). The increased pressure in the conduit that facilitates pumping allows for increased solubility of carbon dioxide in the mix water and greater formation of $CaCO_3$ than would occur at atmospheric pressure carbonation. The carbonation under increased pressure promotes greater and/or faster conversion to $CaCO_3$. It will be appreciated that many or all of the factors that apply to addition of carbon dioxide to the concrete in the conduit also apply to addition of carbon dioxide under pressure at other points in the process, e.g., at the mixer, and in certain embodiments the invention includes the addition of carbon dioxide tinder pressure greater than atmospheric pressure into concrete in a concrete mixer, e.g., at a pressure of at least 5, 10, 20, 30, 50, 100, 150, or 200 psi or greater.

The term "hydraulic cement," as used herein, includes a composition which sets and hardens after combining with water or a solution where the solvent is water, e.g., an admixture solution. After hardening, the compositions retain strength and stability even under water. An important characteristic is that the hydrates formed from the cement constituents upon reaction with water are essentially insoluble in water. A hydraulic cement used in the invention may be any hydraulic cement capable of forming reaction products with carbon dioxide. The hydraulic cement most commonly used is based upon Portland cement. Portland cement is made primarily from limestone, certain clay minerals, and gypsum, in a high temperature process that drives off carbon dioxide and chemically combines the primary ingredients into new compounds. In certain embodiments, the hydraulic cement in the hydraulic cement mix is partially or completely composed of Portland cement.

A "hydraulic cement mix," as that term is used herein, includes a mix that contains at least a hydraulic cement and water. Additional components may be present, such as aggregates, admixtures, and the like. In certain embodiments the hydraulic cement mix is a concrete mix, i.e., a mixture of hydraulic cement, such as Portland cement, water, and aggregate, optionally also including an admixture.

Carbonating in a closed system such as a conduit offers at least four benefits.

1) Mixing carbon dioxide into concrete contained in a vessel open to the atmosphere allows carbon dioxide to escape regardless of its delivery phase (liquid, gas or solid) thereby limiting the overall efficiency of capturing carbon dioxide as stable reaction products. If the process takes place in a conduit (e.g., pipe) then there is physical containment for the carbon dioxide and no possibility of carbon dioxide escaping. In addition, the flow within the pipe can promote mixing between the carbon dioxide and concrete.

2) Introducing carbon dioxide in a pipe allows the system to be pressurized. This allows the carbon dioxide phase to be managed, which offers the possibility of using liquid, gaseous, or supercritical carbon dioxide to mix with the concrete. Advantages of these systems are described in U.S. Pat. No. 5,518,540, incorporated herein by reference in its entirety.

3) The solubility of carbon dioxide is directly dependent on pressure. Increasing the pressure of the system increases the amount of carbon dioxide in solution. A change in pressure can change the equilibrium of the system. If the $CO_2$ injection starts at a given pressure that is then decreased then there is a corresponding decrease in the solubility of the $CO_2$ and the formation of $CaCO_3$ results.

This solubility change can be repeated along the length of the conduit through a pulsing action and a continual supply of $CO_2$ to maintain the gas phase during pressure increases. There are a number of ways to create the pulsation described. Examples are described more fully below and shown in FIG. 1 (Venturi method), FIG. 2 (varying flowrate) and FIG. 3 (varying orifice/valve).

4) It is well known that crystal morphology of $CaCO_3$ is dependent on temperature, pressure and ion content in which it is created. Modifying the pressure of a system allows manipulation of the precipitation products. Forcing rapid precipitation of reaction products via the described method offers the ability to favor formation of a given polymorph, or formation of crystals of a desired size, with benefits to the properties of carbonated concrete such as strength and rheology. Pressure modifications can determine crystal size (faster reactions for smaller crystals) and reaction velocity (faster reactions for more aragonite). Other factors that influence polymorphs include chemical factors, e.g., presence of $Sr^{2+}$, $Ba^{2+}$, $Mg^{2+}$, $SO^{4-}$, temperatures above 30° C., reaction velocity, or pH.

The point of introduction of the carbon dioxide may be any suitable point, so long as at the point of introduction the system is sufficiently closed so as to allow no, or minimal, leakage of the carbon dioxide. In certain embodiments, the carbon dioxide is introduced into a closed mixer in which concrete is mixed. In certain embodiments, the carbon dioxide is introduced at the pump. In certain embodiments, the carbon dioxide is introduced at the conduit, for example, in a line joining the conduit at or near the proximal end of the conduit, to allow maximum distance/time for the carbon dioxide to mix and react with the concrete, however, carbon dioxide may also be introduced further down the length of the conduit if there is sufficient distance/time for mixing and reaction. More than one point of introduction of carbon dioxide may be used, for example, at the pump and at the conduit, or at various points along the conduit, or a combination thereof.

The carbon dioxide is supplied to the concrete in the closed pressurized container, such as mixer, pump, or conduit at a pressure that allows its entrance into the pressurized concrete in the pressurized container, e.g., conduit, thus at or above the pressures in the container, e.g., at which the concrete is pumped. The pressure at which the carbon dioxide is introduced may be at least 50, 100, 200, 300, 400, 500, 600, 700, 800, 900, or 1000 psi. In certain embodiments, the pressure is at least 50 psi. In certain embodiments, the pressure is at least 100 psi. In certain embodiments, the pressure is at least 300 psi. In certain embodiments, the pressure is at least 500 psi. In certain embodiments, the pressure is at least 600 psi. In certain embodiments, the pressure is 100-3000, 100-2000, 100-1500, 200-3000, 200-2000, 200-1500, 300-3000, 300-2000, 300-1800, 300-1600, 300-1500, 300-1400, 300-1300, 300-1200, 400-3000, 400-2000, 400-1800, 400-1600, 400-1500, 400-1400, 400-1300, 400-1200 psi, 500-3000, 500-2000, 500-1800, 500-1600, 500-1500, 500-1400, 500-1300, 500-1200, 600-3000, 600-2000, 600-1800, 600-1700, 600-1600, 600-1500, 600-1400, 600-1300, or 600-1200 psi. In certain embodiment, the pressure is 200 to 1500 psi. In certain embodiments, the pressure is 400 to 1500 psi. In certain embodiment, the pressure is 500 to 1500 psi. In certain embodiments, the pressure is 600 to 1500 psi. The pressure of the carbon dioxide may additionally or alternatively be expressed as a pressure that is a certain amount above the pressure of the concrete in the closed pressurized container, e.g., conduit, such as at least 1, 2, 5, 10, 20, 50, 100, 200, or 500 psi above the pressure of the concrete in the container. e.g., conduit, or 1-1000, 1-500, 1-100, or 1-50 psi above the pressure of the concrete in the container, e.g., conduit or 5-1000, 5-500, 5-100, or 5-50 psi above the pressure of the concrete in the container, e.g., conduit, or 10-1000, 10-500, 10-100, or 10-50 psi above the pressure of the concrete in the container, e.g., conduit. The concrete may be supplied in any suitable form, such as a gas, liquid, supercritical, solid, or any combination thereof, so long as it is in a form that can enter and mix with the concrete in the conduit; the pressure and temperature will dictate which form or forms are suitable. In certain embodiments the carbon dioxide is supplied in liquid firm. In certain embodiments, the carbon dioxide is in supercritical form. The carbon dioxide may be mixed with other gases or it may be pure or substantially pure; in certain embodiments the carbon dioxide is at least 90, 95, 99, or 99.5% pure. In certain embodiments the carbon dioxide is used alone, i.e., not mixed with water, surfactant, or any other substance other than impurities normally present in the carbon dioxide as supplied. It is important to note that the concrete is propelled through the conduit by the pressure of the pump, and that the carbon dioxide as added in the invention is added as a source of carbonation and not as a propellent, as in the case of a shotcrete (concrete spray) application. Thus, for example, in certain embodiments the methods and apparatus of the invention are not shotcrete methods and apparatus.

Typically the carbon dioxide will be pumped from a storage container to the conduit via its own conduit and introduced into the concrete conduit at any suitable location as described herein. Carbon dioxide may be introduced at one point. e.g., at or near the proximal (pump) end of the conduit, or at multiple points, such as at 2, 3, 4, 5, 6, 7, 8, or more points in the conduit. As it is generally advantageous for the carbon dioxide to be in contact with the concrete mix as long as possible, a preferred site of entry is at the pump or at or near the proximal end of the concrete conduit. The positioning of the site or sites of entry also affects the length of time that the concrete is forming carbonates before being discharged from the conduit, as well as the length of time that the concrete is in contact with water after mixing and before contact with carbon dioxide—an earlier point of entry, such as in the mixer, or pump, or at the proximal end of the conduit, means a longer time for the carbon dioxide to be in contact with the concrete and forming carbonation products and a shorter time between beginning of concrete mixing with water and addition of the carbon dioxide. In certain cases, it is desirable that the time of contact with carbon dioxide and carbonation before discharge be relatively short and/or the time from start of mixing be relatively long; in such cases, carbon dioxide may be introduced further toward the distal end of the conduit. In other cases, it is desirable that a longer time of contact with carbon dioxide and carbonation before discharge and time from mixing relatively shorter be used; in such cases, carbon dioxide may be introduced in a pressurized mixer, or in a pump, or further toward the proximal end of the conduit. Any combination of entry points may be used to achieve the desired timing of contact. In certain embodiments, multiple entry points are used so that the concrete is exposed to additional doses of carbon dioxide beyond the first dose, and after the first dose has had a chance to start reacting with the concrete components. The pump, the conduit, an opening of the conduit, or any combination thereof, may be configured so as to provide a variable pressure to the concrete/carbon dioxide mixture as it moves through the conduit.

$CO_2$ injection may take place by as simple a mechanism as a conduit joining the main pumping conduit, where the $CO_2$ is supplied to the side of the concrete stream. Alternatively, or in addition, $CO_2$ may be supplied in such a manner as to be injected into the body of the stream. For example, in certain embodiments, the $CO_2$ injection takes place from within the concrete stream via an injecting member that resides in or is optionally inserted into the concrete. Such a member may have a single outlet or may be, e.g., a linger with multiple perforations, optionally directed in line with the flowing concrete. Several discrete point injections in the stream may be preferable than a single injection at the side of the stream. The injector can be insertable and/or removable, e.g., to allow for cleaning or installation only when needed. Additionally, an inline injector may have a geometry that facilitates mixing. Exemplary embodiments include a grid comprising hollow members with multiple gas injection outlets directed into the concrete, preferably down the stream of the flow. However, any suitable arrangement that facilitates mixing may be used.

In certain embodiments, the carbon dioxide is introduced into the wet concrete mix in the conduit and not further manipulation takes place; as the concrete mix and carbon dioxide travel down the conduit carbonation reactions take place and the concrete is carbonated to the desired degree. In other embodiments, the pressure and/or other aspects of the concrete mix in the conduit are manipulated so as to promote carbonation and/or to promote formation of a desired crystal form of calcium carbonate. In either case, when the concrete exits the conduit, most or all of the carbon dioxide that was introduced into the concrete mix. e.g., at least 60, 70, 80, 90, 95, 97, 98, 99, 99.5, or 99.9%, is within the mix, either as carbonation products, or as dissolved carbon dioxide that is continuing to undergo carbonation reactions, as described below.

Without being bound by theory, it is thought that the following reactions take place: when carbon dioxide is introduced into a wet concrete mix, the reaction of carbon dioxide gas and hydrating cement takes place in solution between $CO_3^{2-}$ and $Ca^{2+}$ ions, ultimately producing calcium carbonate. A simple set of equilibriums can explain the different parameters that impact solubility and thus calcium carbonate formation.

First, carbon dioxide reacts with water to produce carbonic acid, reaction 1:

$$CO_2(g) + H_2O(l) \Leftrightarrow H_2CO_3(aq) \quad [1]$$

The carbonic acid dissociates further creating new deprotonated species of carbonic acid, bicarbonate and carbonate, reactions 2 and 3.

$$H_2CO_3(aq) + H_2O(l) \Leftrightarrow H_3O^-(aq) + HCO_3^-(aq) \quad [2]$$

$$HCO_3^-(aq) + H_2O(l) \Leftrightarrow H_3O^-(aq) + CO_3^{2-}(aq) \quad [3]$$

The solution will contain a mixture of the species $H_2CO_3$, $HCO_3^-$ and $CO_3^{2-}$. In the presence of calcium and carbonic acid, calcium carbonate will precipitate out, reaction 4:

$$CO_3^{2-}(aq) + Ca^{2+}(aq) \Leftrightarrow CaCO_3(s) \quad [4]$$

Since the mix water of a hydrating cement system contains calcium ions, and carbonic acid is the result of the external supply of carbon dioxide, a simplified net reaction to form water soluble bicarbonate can be expressed as reaction 5:

$$Ca(HCO_3)_2(aq) \Leftrightarrow CO_2(g) + H_2O(l) + CaCO_3(s) \quad [5]$$

Calcium and carbonic acid together in liquid form will be in equilibrium with water, solid calcium carbonate and $CO_2$ gas.

Aspects of the calcium carbonate equilibrium can be predicted from Le Châtelier's equilibrium principle. This principle states that a chemical system at equilibrium will always adjust to counteract any imposed change in pressure, temperature, volume or composition. A change in any of these variables can thereby affect the equilibrium and the formation of calcium carbonate. The equilibrium is affected by the parameters as follows.

Pressure dependence: When pressure is decreased in a chemical system, the equilibrium of reaction 5 will respond to increase the pressure. Because $CO_2$ is the only gaseous species, the only way to increase pressure is by shifting the equilibrium towards producing more $CO_2$. This shift in equilibrium means that a decrease in pressure results in increased precipitation of calcium carbonate.

Concentration dependence: If the concentration of calcium or carbonic acid is increased or the partial pressure of $CO_2$ is decreased, then there would be an equilibrium shift of reactions 2 and 3 towards more precipitation of calcium carbonate. Increasing the pH as per the hydration of cement would result in a neutralization of the $H_3O^+$ complex. This will yield more carbonic acid. More carbonic acid will shift the equilibrium of reaction 5 towards the precipitation of more calcium carbonate.

Temperature dependence: The solubility of calcium carbonate decreases as the temperature increases. An increase in temperature will shift the equilibrium of equation 5 towards calcium carbonate formation.

The reaction between the carbon dioxide and the cement be promoted or manipulated by changing the pressure. A pressure drop promotes the formation of calcium carbonate. Upon increasing the pressure the equilibrium would tend to re-form soluble bicarbonate at the expense of carbon dioxide gas, calcium carbonate, and water.

Without being bound by theory, the calcium and carbon dioxide portions of the equilibrium are satisfied by more $Ca^{++}$ having gone into solution form the hydrating cement (in response to consumption of Ca ions in the calcium carbonate formation) and the continued supply of carbon dioxide gas to the system. The calcium carbonate formed during the pressure drop remains stable upon pressure increase due to the fresh supply of the necessary ions.

Figure 1:
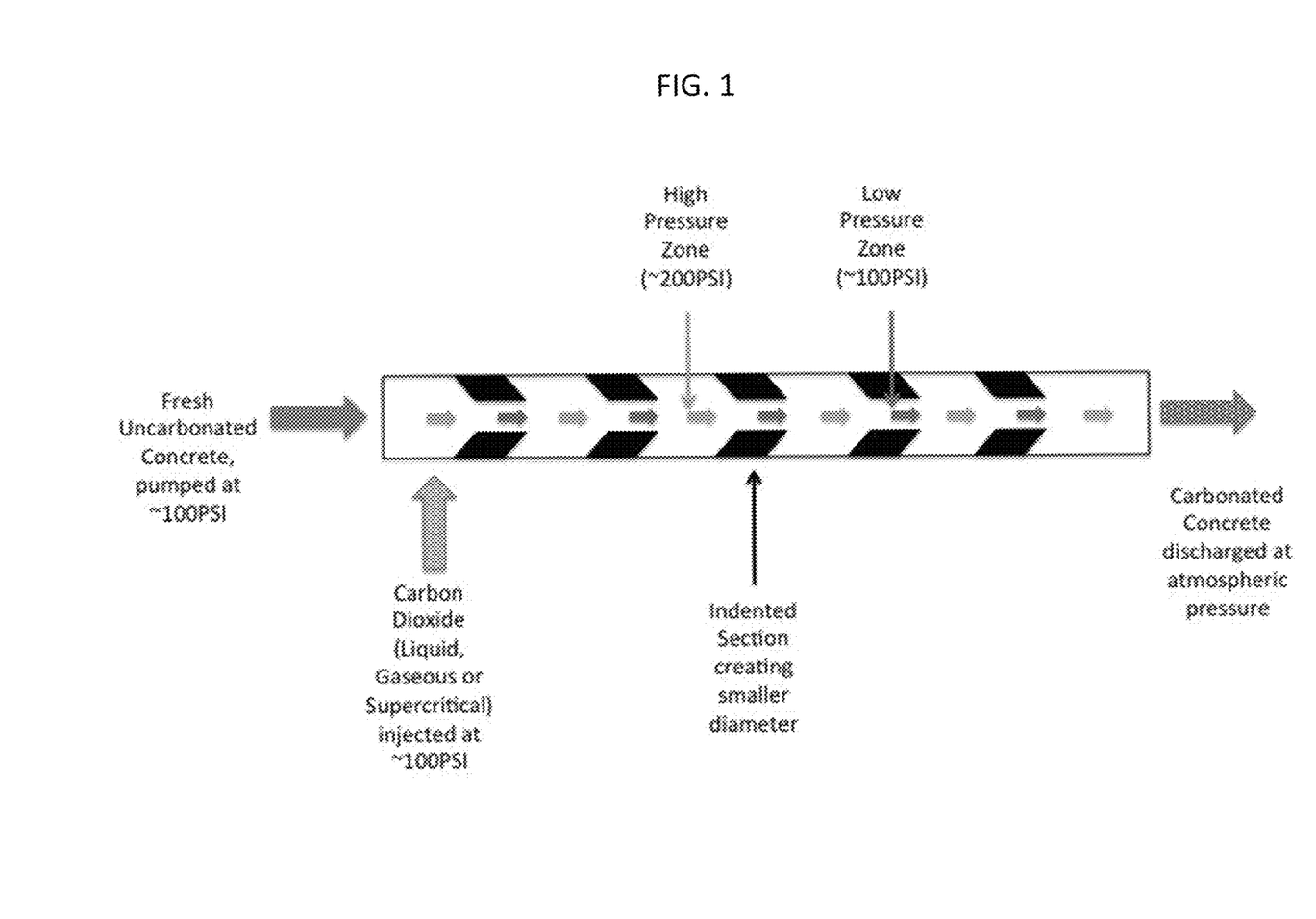
FIG. 1 depicts an embodiment of a Venturi system for creating areas of alternating high and low pressure in a conduit carrying concrete and carbon dioxide.
Figure 2:
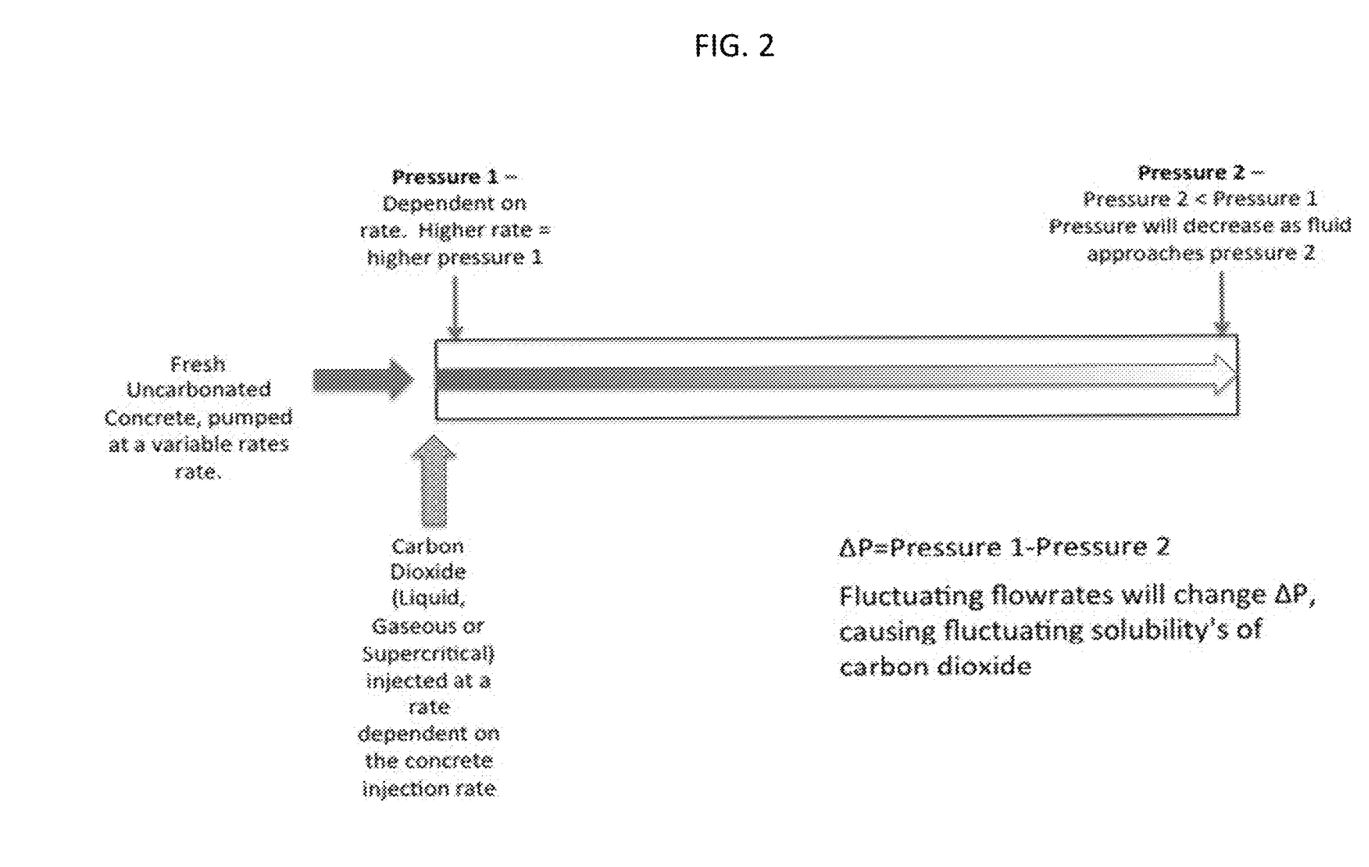
FIG. 2 depicts an embodiment of a fluctuating flowrate system for creating differential high and low pressure in a conduit carrying concrete and carbon dioxide.
Figure 3:
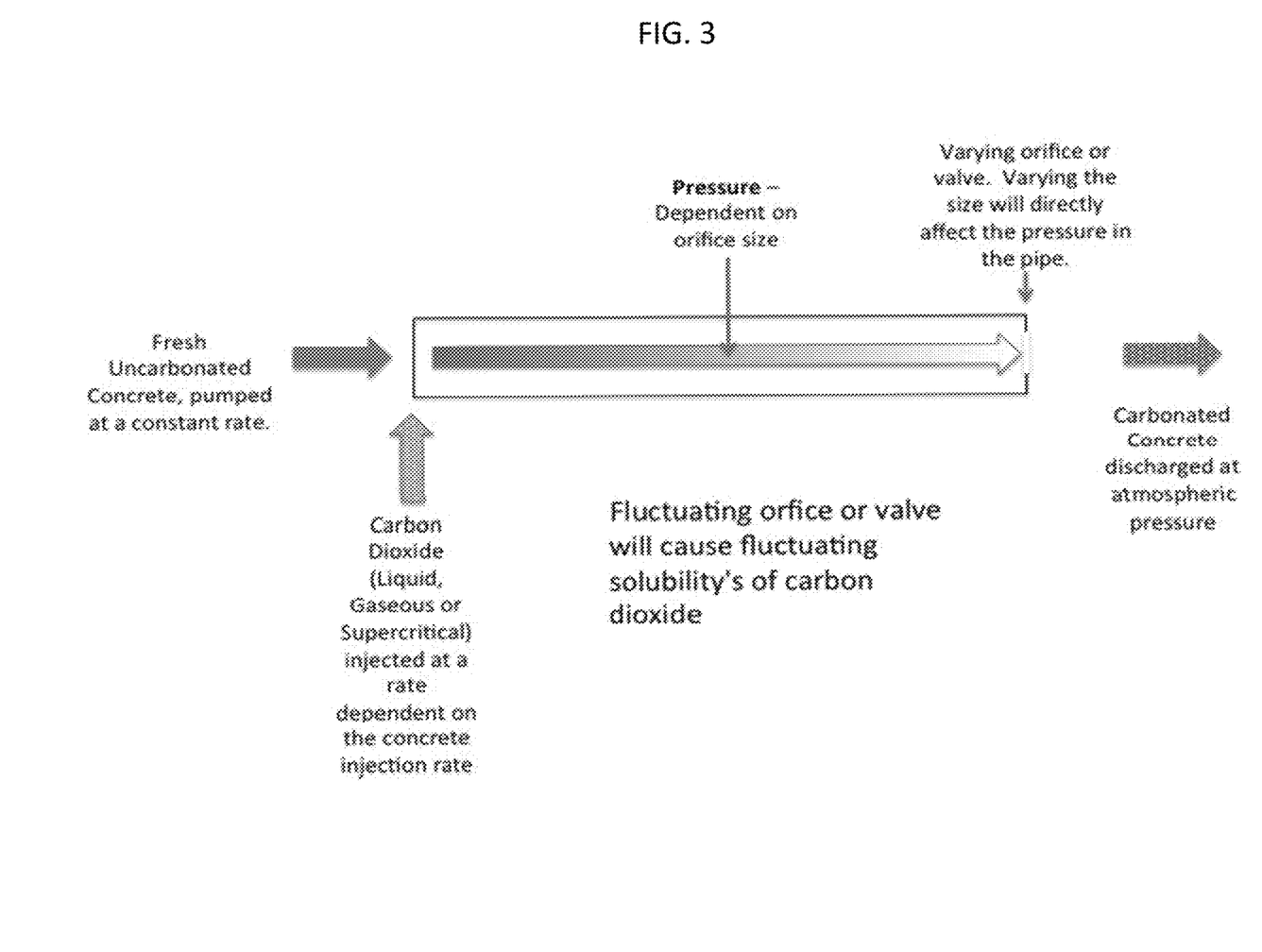
FIG. 3 depicts an embodiment of a fluctuating orifice/valve system for creating differential high and low pressure in a conduit carrying concrete and carbon dioxide.

Thus, in certain embodiments, the invention provides methods and compositions for varying the pressure in a closed conduit in which carbon dioxide is mixed with a hydraulic cement mix, e.g., a concrete mix, to promote carbonation and/or to promote the formation of desired polymorphs of calcium carbonate. Any suitable method/apparatus may be used so long as it provides for variations in the pressure to which the concrete mix is subjected in the conduit to promote the formation of $CaCO_3$, either in a single event, continuous down the length, or over more than one increase/decrease cycles. Three exemplary apparatus are illustrated in FIGS. 1-3. FIG. 1 shows a Venturi system for alternating pressure decrease and increase, where a conduit is modified to provide for areas of constriction; as concrete flows through these areas, due to the Venturi effect, the pressure decreases, and as the concrete flows into expanded sections, the pressure increases. A single constriction may be used or, as illustrated in FIG. 1, a plurality of constrictions may be used. In certain embodiments, instead of a constriction, a grate may be utilized, which provides not only for a constricted flow but also for increased mixing. FIG. 2 illustrates a fluctuating flow rate system for providing pressure variation. In this system, the flow rate of the concrete is varied by pumping at variable rates, thus changing the pressure in the system in a variable manner. FIG. 3 illustrates a system in which a valve or orifice at the distal end of the conduit is varied in size, affecting pressure in the conduit; the smaller the orifice, the higher the pressure in the conduit.

Pressure and/or other variables manipulation may also be used to manipulate the crystal form, i.e., polymorph, of calcium carbonate that is formed. Calcium carbonate exists as four polymorphs: from least stable to most stable (at atmospheric pressure, neutral pH, and room temperature), these are amorphous calcium carbonate (ACC), vaterite, aragonite, and calcite. However, changes in conditions, e.g., pressure, can affect stability of polymorphs; for example, at high pressures, aragonite is more stable than calcite. Thus the invention includes manipulating pressure and/or other variables in such a way as to favor the formation of one polymorph of calcium carbonate, such as to favor the formation of ACC, or to favor the formation of vaterite, or to favor the formation of aragonite, or to favor the formation of calcite. For example, the degree and speed of a pressure variation may be manipulated so as to favor the precipitation of a particular polymorph. In addition, crystal size may also be manipulated by manipulating conditions.

In certain cases, one or more admixtures may be added to the concrete mix. Depending on the mix design and other conditions, carbonation of wet concrete mixes can lead to alterations certain characteristics. e.g., in flow characteristics, such as decreased flowability, or early strength development, such as strength at 24 hours, or 7, 14, or 28 days. In some cases it may be desirable to add one or more admixtures to counteract such changes. The admixture may be added at any suitable point in the process, such as at the batching plant, in the ready mix truck, in the hopper, or at one or more points in the conduit, e.g., at one point, 2 separate points, 3 separate points, or 4, 5, 6, 7, 8, or more than 8 separate points, or any combination thereof, so long as sufficient mixing is provided to allow homogeneous incorporation of the admixture into the mixture. In certain embodiments, one or more admixtures is added at the hopper. In certain embodiments, one or more admixtures is added in the conduit, at one or more points in the conduit as described herein. In some cases, one or more coarse grates, or similar devices, may be placed in the conduit to provide for thorough mixing of the admixture into the concrete mix. Any suitable admixture may be used to achieve the desired effect, such as improved flowability or improved early strength. Admixtures suitable for use in the invention are described in PCT Application No. PCT/CA2014/050611, and U.S. patent application Ser. No. 14/249,308, 61/839, 312, 61/847,254, 61/879,049, 61/925,100 and 61/938,063, all of which are incorporated herein by reference in their entirety. In certain embodiments, the admixture is a carbohydrate, i.e., saccharide, such as sugars, e.g., fructose, glucose, and sucrose, and sugar acids/bases, such as sodium gluconate and sodium glucoheptonate; phosphonates, such as nitrilotri(methylphosphonic acid), 2-phosphonobutane-1, 2,4-tricarboxylic acid; and chelating agents, such as EDTA, Citric Acid, and nitrilotriacetic acid. Other saccharides and saccharide-containing admixes of use in the invention include molasses and corn syrup. In certain embodiments, the admixture is sodium gluconate.

In certain cases, feedback from the operation may be used to modify the addition of carbon dioxide and/or other parameters, such as pump operation, addition of admixture, and the like. For example, increase in temperature of the concrete mix is indicative of extent of carbonation, and one or more temperature sensors on or in the conduit can provide feedback indicating whether the desired degree of carbonation is being achieved, allowing for adjustment of the rate of addition of carbon dioxide to the system. Other sensors include carbon dioxide sensors, which may be placed at the distal end of the conduit to indicate whether unreacted carbon dioxide is exiting the conduit, indicating a need for reduction of carbon dioxide addition. Such sensors can also be used to ensure worker safety in any enclosed spaces in which the concrete is poured. Additional sensors and feedback mechanisms may be found in PCT Application No. PCT/CA2014/050611, and U.S. patent application Ser. No. 14/249,308, 61/839,312, 61/847,254, 61/879,049, 61/925, 100 and 61/938,063, all of which are incorporated herein by reference in their entirety.

A control system can monitor pumping pressure and start injection once a desired pressure has been released. The pressure in the concrete builds from zero in an empty pipe to a maximum as the more concrete fills the conduit, and the $CO_2$ injection can have a lower limit on pressure input given that the pressure drop from the liquid injection to the concrete can determine the gas/liquid/solid balance of the injected $CO_2$.

Dose of Carbon Dioxide Added to Concrete

The dose of the carbon dioxide added to the concrete in embodiments of the invention may be any suitable dose.

Low doses of carbon dioxide, e.g., less than 1%, preferably less than or equal to 0.5% carbon dioxide by weight cement (bwc) are used in certain embodiments of the invention. Such low doses are advantageous in that the carbon dioxide is quickly and easily taken up by the concrete, generally does not appreciably alter the flowability of the concrete, and can increase early strength development of the concrete. Thus, in certain embodiments, carbon dioxide is added to the pressurized concrete, for example, concrete in a conduit, at a dose of no more than 1, 0.9, 0.8, 0.7, 0.6, 0.5, 0.4, 0.3, 0.2, 0.1, 0.05, or 0.01% bwc, in certain cases also no less than 0.9, 0.8, 0.7, 0.6, 0.5, 0.4, 0.3, 0.2, 0.1, 0.05, 0.01, or 0.005% bwc, such as a dose between 0.005 and 1% bwc, or 0.05 and 1% bwc, or 0.05 and 0.7% bwc, or 0.05 and 0.5% bwc, or 0.05 and 0.3% bwc, or 0.05 and 0.1% bwc, or 0.1 and 1% bwc, or 0.1 and 0.7% bwc, or 0.1 and 0.5% bwc, or 0.1 and 0.3% bwc. In certain embodiments, carbon dioxide is added at a dose of between 0.05 and 0.5% bwc.

Higher doses of carbon dioxide, e.g., 0.5-5% bwc, preferably greater than or equal to 1% bwc, are used in certain embodiments of the invention. Higher doses can affect the flowability of the concrete, generally decreasing flowability. This can be useful in applications where it is desired that the concrete quickly becomes self-supporting, for example, in 3D concrete printing applications, or any other application in which rapid development of self-supporting concrete is desired. Thus, in certain embodiments, carbon dioxide is added to the pressurized concrete, for example, concrete in a conduit, at a dose of no less than 5, 4, 3, 2, 1.5, 1.2, 1, 0.8, or 0.5% bwc, in certain cases also no more than 5, 4, 3, 2, 1.5, 1.2, 1, 0.8, or 0.5% bwc, such as a dose between 0.5 and 5% bwc, or 0.8 and 5% bwc, or 1 and 5% bwc, or 2 and 5% bwc, or 3 and 5% bwc, or 0.5 and 4% bwc, or 0.8 and 4% bwc, or 1 and 4% bwc, or 2 and 4% bwc, or 0.5 and 3% bwc, or 0.8 and 3% bwc, or 1 and 3% bwc.

It will be appreciated that in embodiments in which the carbon dioxide is added to concrete flowing in a conduit, the flow rate of the carbon dioxide may be adjusted according to the flow rate of the concrete so as to achieve the desired dosage over the course of the pour; minor variations are acceptable so long as the overall dosing is achieved.

Methods, Systems, Compositions, and Apparatus

The methods and compositions involve wet concrete pumped under pressure through a conduit in the presence of carbon dioxide, and apparatus and compositions for doing so.

In certain embodiments, the invention provides a method of carbonating concrete comprising i) pumping a wet concrete mix into a conduit at a pressure sufficient to move the concrete through the conduit at a desired rate; ii) introducing carbon dioxide into the conduit at a pressure at or above the pressure of i). The carbon dioxide may be introduced at any suitable point, as described herein for example, at a pump that pumps the concrete into the conduit, or at or near the distal end of the conduit, or elsewhere in the conduit, or any combination thereof. The pressure at which the carbon dioxide is introduced into the conduit may be any pressure as described herein, such as at least 50 psi, for example, at least 100 psi, or even at least 300 or at least 500 psi. Other suitable pressures are described elsewhere herein. The dosage of the carbon dioxide added to the concrete may be any suitable dosage as described herein, such as between 0.05 and 0.5% bwc, or between 0.5 and 5% bwc. The carbon dioxide can be transported to the conduit in any suitable form, such as in liquid form; in the later case, when the carbon dioxide is released into the conduit it may be released under conditions whereby the carbon dioxide becomes gaseous and solid in the conduit. In certain embodiments the carbon dioxide is in supercritical form. The initial state of the $CO_2$ in the line will depend on the change in pressure of the $CO_2$ from the tank to the pump. At low pump pressures (<20-30 bar depending on temperature) there is a phase change to vapor/solid and the temperature of the concrete will result in the sublimation of any solids quickly. At high pump pressures the $CO_2$ can enter and remain liquid (>300 psi or 21 bar). The pressure in the conduit depends on position and time of the pump cycle. The static pressure relates to how much concrete is above the position of interest and thus decreases with increasing height in the conduit. The pumping pressure occurs when the concrete moves. The pump cycle moves the concrete according to its displacement (on the order of 1-2 feet). The pressure at all locations increases while the concrete moves. Thus, as the concrete is pumped up the boom, the pressure drops causing the $CO_2$ to go through a phase change to vapor/solid, then as it is discharged the pressure can drop to zero or negative. The concrete temperature will sublimate the solid $CO_2$, if any. If there is not enough time for the $CO_2$ to be taken up during the pumping then it can go into the atmosphere or into the form as the concrete is discharged. The concrete may be manipulated so that it is under variable pressure down the length of the conduit. In certain cases, this may be done by having at least one constricted section in the conduit, or a plurality of constricted sections alternating with expanded sections; see, e.g., FIG. 1. Alternatively, or in addition, the variable pressure can be provided by varying the rate of pumping of concrete into the conduit; see, e.g., FIG. 2. Alternatively, or in addition, the variable pressure can be provided by pumping the concrete at a constant rate at the proximal end of the conduit and varying the size of an orifice or valve at the distal end of the conduit. One or more admixtures may be added to the mix as described elsewhere herein. In addition, one or more feedback mechanisms as described elsewhere herein may be used to adjust, e.g., carbon dioxide addition according to one or more characteristics of the concrete mix or apparatus.

In certain embodiments the invention provides a method of modulating the crystal structure and/or crystal size of calcium carbonate formed in a wet hydraulic cement mix comprising mixing the wet hydraulic cement mix with carbon dioxide in an gastight container and varying the pressure of the mix, thereby modulating the crystal structure and/or crystal size of the calcium carbonate formed from the carbonation of the mix, compared to crystal structure and/or crystal size that would have been formed without modulation. The closed container may be a conduit as described herein. e.g., a conduit through which wet concrete mix is pumped, and the pressure modulation may be achieved as described herein.

In certain embodiments the invention provides an apparatus for moving wet concrete mix from a first area to a second area and adding carbon dioxide to the mix comprising i) a container for holding mixed wet concrete in the first area; ii) a conduit operably connected to the container and extending to the second area; iii) a system for providing pressure to the concrete to move it from the container, into the conduit at a proximal end of the conduit, and out of the conduit at a distal end into the second area; iv) a system for supplying carbon dioxide operably connected to the system of iii) or the conduit of ii) configured to introduce carbon dioxide under pressure to the wet concrete mix so that the carbon dioxide mixes with the concrete passing through the conduit. The container may be, e.g., a hopper of a concrete pump system, and the system for providing pressure may be a concrete pump such as a boom pump, line pump, skid or rail pump, or any other pump known or developed in the art. In certain embodiments the system for supplying pressure is a boom pump, a line pump, or a skid or rail pump. The carbon dioxide may be liquid, gaseous, solid, or supercritical carbon dioxide, or any combination thereof. In certain embodiments the carbon dioxide is liquid carbon dioxide; in such an embodiment, the system for supplying carbon dioxide may be configured to introduce the liquid carbon dioxide to the conduit in such a manner that the carbon dioxide becomes solid and gaseous carbon dioxide. The system for supplying carbon dioxide may be configured to introduce the carbon dioxide at any suitable pressure into the mix, such as into the conduit, as described herein, such as at pressure of at least 50 psi, for example, at least 100 psi, or even at least 300 or at least 500 psi. Other suitable pressures are described elsewhere herein. The conduit can comprise at least one constricted area to decrease the pressure of the concrete/carbon dioxide mixture flowing through the constricted area, or a plurality of such constricted areas alternating with expanded areas to provide areas of alternating decreasing and increasing pressure to the concrete/carbon dioxide mixture flowing through the conduit. Alternatively, or additionally, the system for providing pressure to the concrete can be configured to provide variable pressure to the concrete as it is pumped through the conduit. Alternatively or additionally, the distal end of the conduit comprises an orifice or valve, wherein the orifice or valve is configured to provided a variable size so as to vary the pressure of the concrete/carbon dioxide mixture in the conduit. The apparatus may further be provided with one or more sensors for sensing one or more of temperature of the concrete mix, carbon dioxide concentration, or other relevant characteristic, and providing feedback to the system of iii) to adjust the rate of addition of carbon dioxide according to the degree of carbonation of the wet concrete mix. The apparatus may be provided with one or more systems for adding admixture to the wet concrete mix, such as a system configured to add on or more admixtures to the mix in the container for holding the mixed wet concrete, the system for providing pressure to the concrete, the conduit, or any combination thereof.

The invention also provides for retrofitting an existing apparatus to add carbon dioxide to the wet concrete mix in the conduit, such as by adding to the apparatus a container for the carbon dioxide, a conduit for carrying the carbon dioxide to the concrete pump system, and the necessary fittings, regulators, valves and the like to allow the carbon dioxide to be added at the desired location, pressure, and flow rate.

In certain embodiments the invention provides a conduit for transporting a wet concrete mixture mixed with carbon dioxide from a first area to a second area, where the conduit comprises at least one constricted area so that the concrete flowing through the conduit experiences a reduced pressure as it flows through the restricted area and increased pressure as it flows beyond the constricted area. In certain embodiments, the constricted area constricts the cross sectional area of the conduit by at least 20, 30, 40, 50, 60, 70, 80, or 90%. The conduit may comprise a plurality of restricted areas alternating with expanded areas so that the concrete flowing through the conduit experiences alternating reduced and increased pressures as it flows through the conduit, such as 2, 3, 4, 5, 6, 7, 8, 9, 10, or more than 10 constricted areas.

In certain embodiments, the invention provides a conduit for transporting a wet concrete mixture mixed with carbon dioxide from a first area to a second area, where the conduit comprises a proximal end at the first area and a distal end at the second area, and where the distal end of the conduit is configured to provide an orifice or valve for the exit of the concrete of variable size. The size of the orifice or valve may be varied by at least 10, 20, 30, 40, 50, 60, 70, 80, 90, or 95%. The orifice or valve may further comprise a system for varying the size of the orifice or valve, such as in a predetermined manner, to provide an alternation of high and low pressure in the conduit.

In certain embodiments, the invention provides a conduit for transporting a wet concrete mixture mixed with carbon dioxide from a first area to a second area and the carbonated wet concrete mix, where the wet concrete mix at the end of the conduit in the second area contains calcium carbonate that comprises at least 10, 20, 30, 40, 50, 60, 70, 80, or 90% aragonite. In certain embodiments, the invention provides a conduit for transporting a wet concrete mixture mixed with carbon dioxide from a first area to a second area and the carbonated wet concrete mix, where the wet concrete mix at the end of the conduit in the second area contains calcium carbonate that comprises at least 10, 20, 30, 40, 50, 60, 70, 80, or 90% vaterite. In certain embodiments, the invention provides a conduit for transporting a wet concrete mixture mixed with carbon dioxide from a first area to a second area and the carbonated wet concrete mix, where the wet concrete mix at the end of the conduit in the second area contains calcium carbonate that comprises at least 10, 20, 30, 40, 50, 60, 70, 80, or 90% amorphous calcium carbonate.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of carbonating concrete comprising
   i) pumping a wet concrete mix into a conduit at a pressure sufficient to move the concrete through the conduit at a desired rate;
   ii) introducing carbon dioxide into the conduit at a pressure at or above the pressure of i); wherein the carbon dioxide is transported to the conduit in liquid form and released into the conduit under conditions whereby the carbon dioxide becomes gaseous and solid in the conduit.
2. The method of claim 1 wherein the pressure at which the carbon dioxide is introduced into the conduit is greater than 50 psi.
3. The method of claim 1 wherein the conduit provides a variable pressure down its length.
4. The method of claim 3 wherein the variable pressure is provided by the presence of at least one constricted section in the conduit, varying the rate of pumping of concrete into the conduit, pumping the concrete at a constant rate at the proximal end of the conduit and varying the size of an orifice at the distal end of the conduit, or a combination thereof.
5. The method of claim 4 wherein the variable pressure is provided by a plurality of at least one constricted section in the conduit which alternate with expanded sections.
6. The method of claim 3 wherein the variable pressure is provided by varying the rate of pumping of concrete into the conduit.
7. The method of claim 3 wherein the variable pressure is provided by pumping the concrete at a constant rate at the proximal end of the conduit and varying the size of an orifice at the distal end of the conduit.
8. The method of claim 1 further comprising determining one or more characteristics of the wet concrete mix, the conduit, or the area around the conduit.
9. The method of claim 8 wherein the characteristic is temperature or carbon dioxide concentration.
10. The method of claim 8 further comprising adjusting the rate of introduction of carbon dioxide based on the characteristic.
11. The method of claim 5 wherein the variable pressure is provided by a plurality of constricted sections in the conduit which alternate with expanded sections.
12. The method of claim 1 wherein the carbon dioxide is introduced into the conduit in an amount sufficient to provide a dose of carbon dioxide to the wet concrete mix of 0.005 to 1% by weight cement (bwc).
13. The method of claim 1 wherein the carbon dioxide is introduced into the conduit in an amount sufficient to provide a dose of carbon dioxide to the wet concrete mix of 0.5 to 5% by weight cement (bwc).
14. The method of claim 10 wherein the characteristic is carbon dioxide concentration measured at the distal end of the conduit indicating whether unreacted carbon dioxide is exiting the conduit.
15. The method of claim 14 wherein the rate of carbon dioxide introduction into the conduit is adjusted according to the carbon dioxide concentration at the distal end of the conduit so that at least 60% of the carbon dioxide introduced into the concrete mix remains within the mix.
16. The method of claim 1 wherein the pressure at which the carbon dioxide is introduced to the conduit is at least 10 psi above the pressure of the concrete in the conduit.
17. The method of claim 1 in which the method is not a shotcrete method.
18. The method of claim 1 further comprising adding an admixture to the concrete mix, wherein the admixture affects flowability of the concrete mix, early strength development of the concrete mix, or a combination thereof.
19. The method of claim 18 wherein the admixture comprises a carbohydrate.

* * * * *